US012677261B2

(12) United States Patent
Chen et al.

(10) Patent No.: US 12,677,261 B2
(45) Date of Patent: Jul. 7, 2026

(54) METHODS AND ARRANGEMENTS FOR LARGE RESOURCE UNIT ALLOCATION

(71) Applicant: Intel Corporation, Santa Clara, CA (US)

(72) Inventors: Xiaogang Chen, Portland, OR (US); Thomas Kenney, Portland, OR (US); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 17/359,560

(22) Filed: Jun. 26, 2021

(65) Prior Publication Data

US 2021/0329637 A1 Oct. 21, 2021

Related U.S. Application Data

(60) Provisional application No. 63/053,080, filed on Jul. 17, 2020.

(51) Int. Cl.
*H04W 72/0453* (2023.01)

(52) U.S. Cl.
CPC .............................. *H04W 72/0453* (2013.01)

(58) Field of Classification Search
None
See application file for complete search history.

(56) References Cited

U.S. PATENT DOCUMENTS

| | | | | |
|---|---|---|---|---|
| 2020/0413382 A1* | 12/2020 | Huang | .................. | H04L 1/0046 |
| 2021/0045151 A1* | 2/2021 | Chen | ................... | H04W 74/004 |
| 2021/0143966 A1* | 5/2021 | Yu | ......................... | H04L 5/0053 |
| 2021/0160959 A1* | 5/2021 | Cao | ...................... | H04L 5/0044 |
| 2021/0258115 A1* | 8/2021 | Liu | ...................... | H04L 5/0053 |
| 2023/0016370 A1* | 1/2023 | Kim | ...................... | H04L 5/0094 |
| 2023/0319629 A1* | 10/2023 | Ko | ......................... | H04L 1/0007 370/230 |
| 2023/0319884 A1* | 10/2023 | Ko | ....................... | H04W 74/002 370/329 |
| 2023/0344608 A1* | 10/2023 | Park | ...................... | H04L 5/0092 |

* cited by examiner

*Primary Examiner* — Srinivasa R Reddivalam
(74) *Attorney, Agent, or Firm* — KDW FIRM PLLC

(57) ABSTRACT

Logic to generate a 320 megahertz (MHz) extremely high throughput (EHT) physical layer protocol data unit (PPDU) comprising a multi-resource unit (MRU). Logic to generation of a non-orthogonal frequency division multiple access (non-OFDMA) 320 MHz EHT PPDU, wherein the MRU comprises a 240 MHz multi-MRU, the 240 MHz MRU comprising at least two contiguous 996 tone resource units (RUs). Logic to generation of an OFDMA 320 MHz EHT PPDU, wherein the MRU comprises at least one 996 tone RU and one 484 tone RU. Logic to cause the transmission of the 320 MHz EHT PPDU. And logic to receive and decode the 320 MHz EHT PPDU.

25 Claims, 17 Drawing Sheets

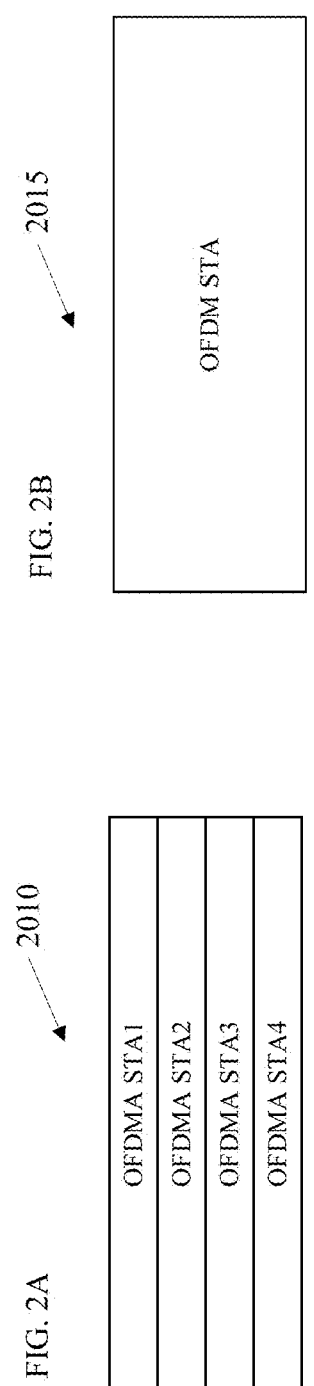
FIG. 2A
FIG. 2B
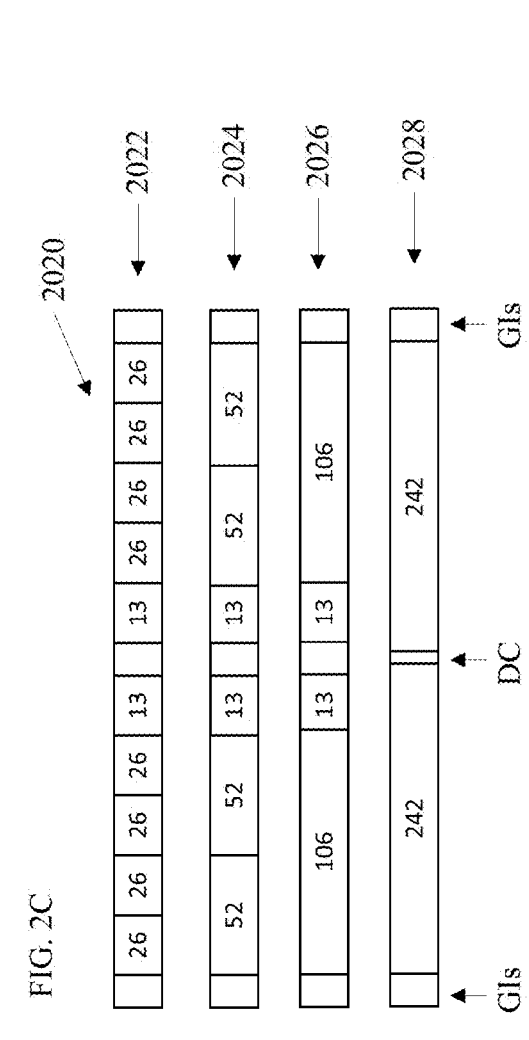
FIG. 2C

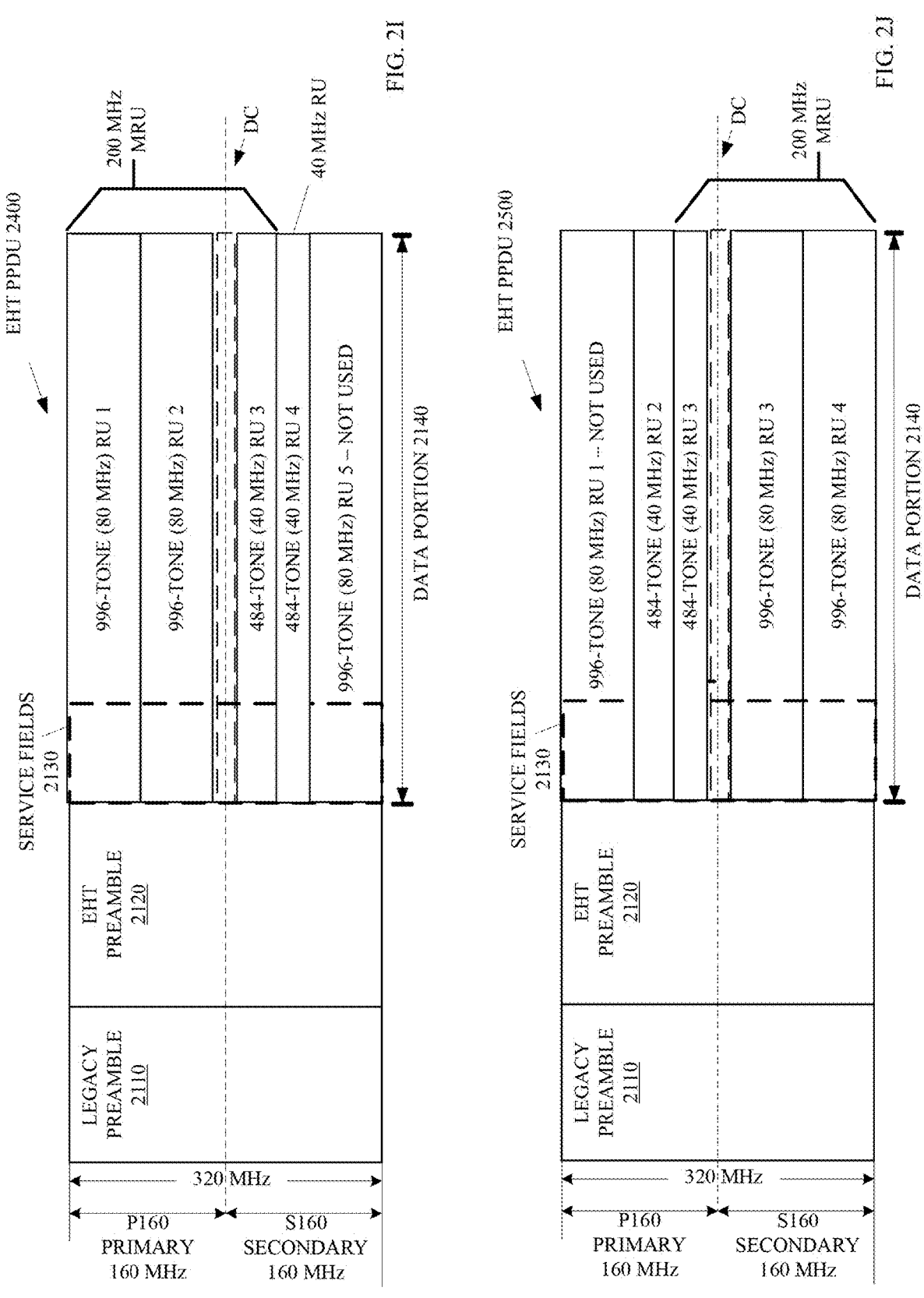

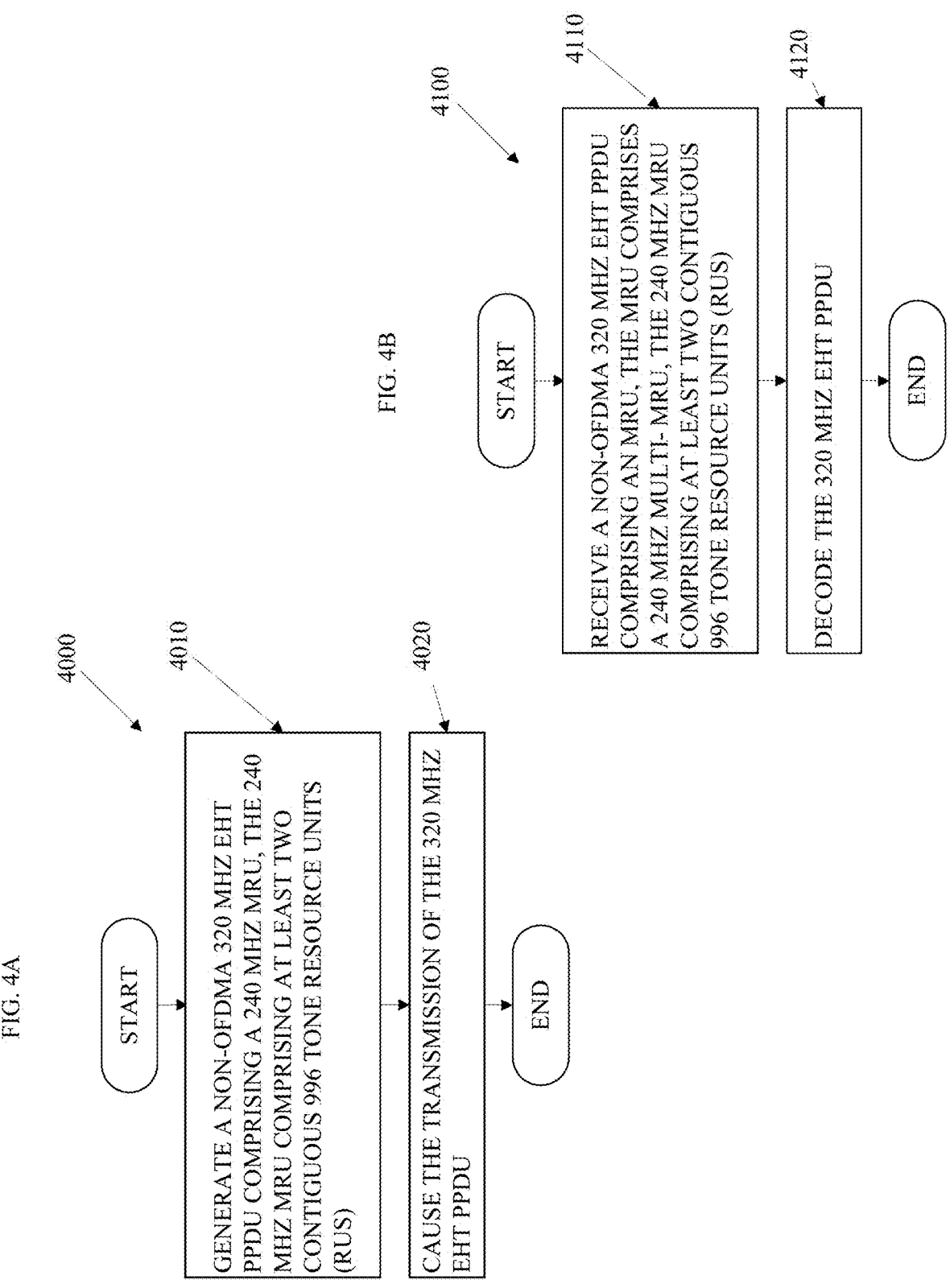

START

4010

GENERATE A NON-OFDMA 320 MHZ EHT PPDU COMPRISING A 240 MHZ MRU, THE 240 MHZ MRU COMPRISING AT LEAST TWO CONTIGUOUS 996 TONE RESOURCE UNITS (RUS)

4020

CAUSE THE TRANSMISSION OF THE 320 MHZ EHT PPDU

END

START

4110

RECEIVE A NON-OFDMA 320 MHZ EHT PPDU COMPRISING AN MRU, THE MRU COMPRISES A 240 MHZ MULTI- MRU, THE 240 MHZ MRU COMPRISING AT LEAST TWO CONTIGUOUS 996 TONE RESOURCE UNITS (RUS)

4120

DECODE THE 320 MHZ EHT PPDU

END

4400

START

RECEIVE A WIRELESS COMMUNICATION SIGNAL FROM A DEVICE    4410

CONVERT THE COMMUNICATION SIGNAL TO AN MPDU    4415

PASS THE MPDU TO THE MAC LAYER    4420

DETERMINE A FRAME FROM THE MPDU    4425

END

4300

START

PREPEND A MAC FRAME WITH A PREAMBLE TO CREATE A PPDU    4310

CONVERT THE PPDU TO A COMMUNICATION SIGNAL    4315

TRANSMIT THE COMMUNICATION SIGNAL    4320

END

STORAGE MEDIUM 7000

COMPUTER EXECUTABLE INSTRUCTIONS FOR 7000

COMPUTING PLATFORM 8000

PROCESSING COMPONENT 8010

APPARATUS 8015

STORAGE MEDIUM 8020

OTHER PLATFORM COMPONENTS 8025

COMMUNICATIONS INTERFACE 8030

METHODS AND ARRANGEMENTS FOR LARGE RESOURCE UNIT ALLOCATION

CROSS REFERENCE TO RELATED APPLICATIONS

This application also claims priority under 35 USC § 119 from U.S. Provisional Application No. 63/053,080, entitled "MULTI RESOURCE UNIT DEFINITION IN THE 240 MHZ TRANSMISSION OF 320 MHZ PHYSICAL LAYER PROTOCOL DATA UNIT", filed on Jul. 17, 2020, the subject matter of which is incorporated herein by reference.

TECHNICAL FIELD

This disclosure generally relates to systems and methods for wireless communications and, more particularly, to large multi-resource unit (MRU) definitions for an Orthogonal Frequency-Division Multiple Access (OFDMA) and a non-OFDMA transmission of 320 MHz physical layer (PHY) protocol data unit (PPDU).

BACKGROUND

The increase in interest in network and Internet connectivity and Internet of Things (IoT) drives design and production of new wireless products. The escalating numbers of wireless devices active as well as the bandwidth demands of the users of such devices are increasing bandwidth demands for access to wireless channels. The Institute of Electrical and Electronics Engineers (IEEE) is developing one or more new standards that utilize Orthogonal Frequency-Division Multiple Access (OFDMA) and non-OFDMA in channel allocation to increase bandwidth and data throughput capabilities of the devices such as access points to increase bandwidth and data throughput demands from users. These new standards require operability with legacy devices and other concurrently developing communications standards.

BRIEF DESCRIPTION OF THE DRAWINGS

FIG. 2A depicts an embodiment of transmissions between four stations and an AP.

FIG. 2B depicts an embodiment of a transmission between one station and an AP.

FIG. 2C depicts an embodiment of a resource units in a 20 megahertz (MHz) bandwidth.

FIGS. 2I-J depict embodiments of an IEEE 802.11be OFDMA 320 MHz EHT PPDU.

FIGS. 4A-B depict embodiments of flowcharts to generate, transmit, receive, and decode a non-OFDMA 320 MHz EHT PPDU.

DETAILED DESCRIPTION OF EMBODIMENTS

Figure 1A:
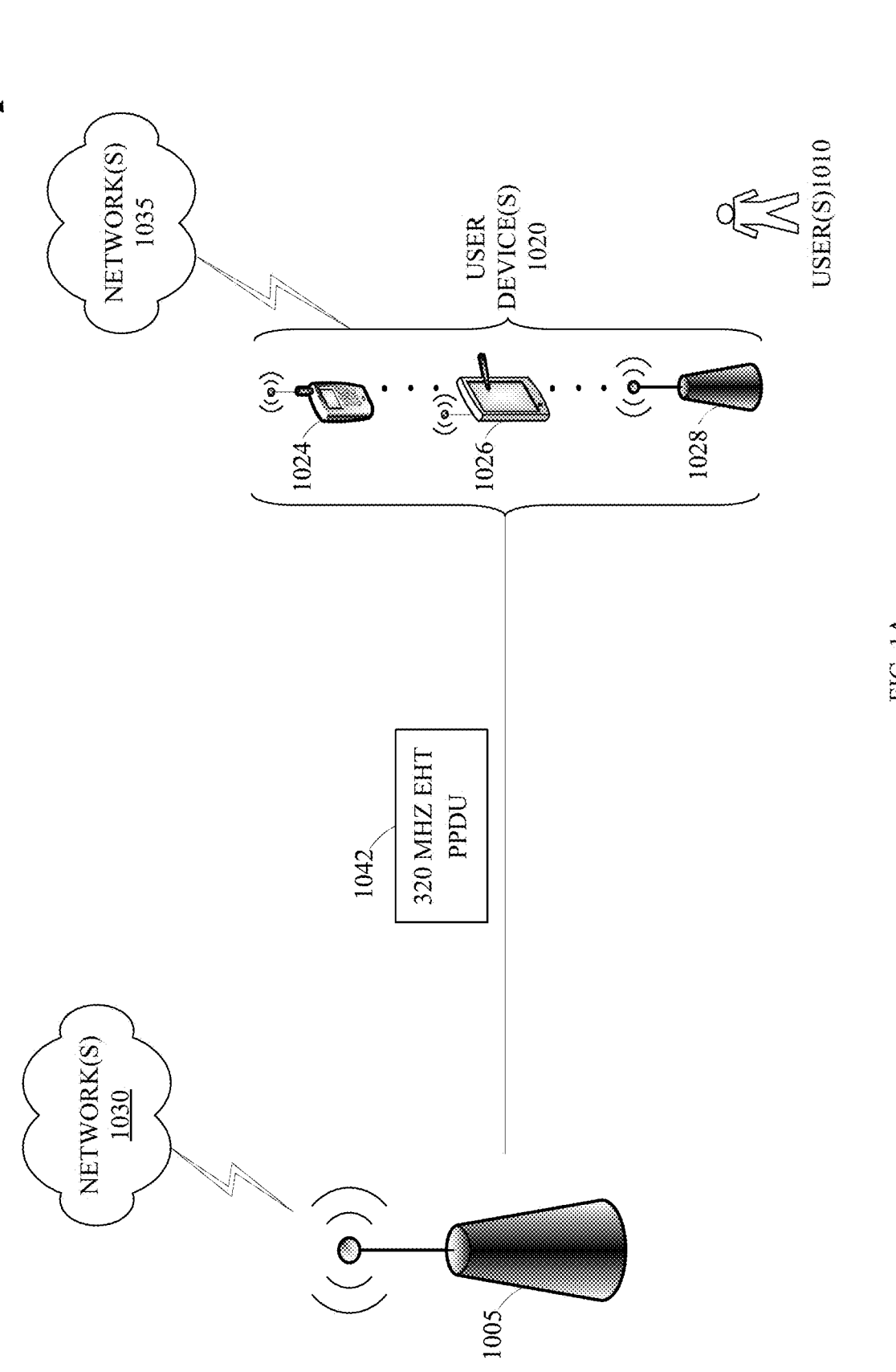
FIG. 1A is a system diagram illustrating an embodiment of a network environment for 320 MHz PPDU logic circuitry, in accordance with one or more example embodiments.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Embodiments relate to 320 MHz PPDU logic circuitry to facilitate communications by stations (STAs) in accordance with versions of Institute of Electrical and Electronics Engineers (IEEE) 802.11 standards for wireless communications such as IEEE P802.11be™/D1.0, May 2021; IEEE 802.11-2020, December 2020; IEEE P802.11ax™/D8.0, IEEE P802.11ay™/D7.0, IEEE P802.11az™/D3.0, IEEE P802.11ba™/D8.0, IEEE P802.11bb™/D0.4, IEEE P802.11bc™/D1.02, and IEEE P802.11bd™/D1.1.

Extremely high throughput (EHT) STAs are 320 MHz EHT PPDUs on 6 GHz carrier. The allowed PPDU for EHT STAs include 20 MHz PPDUs, 40 MHz PPDUs, 80 MHz PPDUs, 160 MHz PPDUs, and 320 MHz PPDUs. Embodiments herein facilitate a merger of 240 MHz transmission by EHT STAs within the 320 MHz PPDU definition by creating multi-RUs (MRUs). The 320 MHz PPDU logic circuitry may advantageously combine multiple large RUs (240 tone RUs or larger) to form large RUs assignable to EHT STAs.

In some embodiments, the 320 MHz PPDU logic circuitry may generate a 240 MHz MRU for a non-orthogonal frequency division multiple access (non-OFDMA) 320 MHz EHT PPDU. In such embodiments, the 240 MHz MRU may comprise at least two contiguous 996 tone RUs. For instance, some embodiments may generate the 240 MHz MRU as three contiguous 996 tone RUs in a primary 160 MHz portion of a 320 MHz EHT PPDU. Further embodiments may generate the 240 MHz MRU as three contiguous 996 tone RUs with two of the 996 tone RUs residing in a primary 160 MHz portion of a 320 MHz EHT PPDU. Some embodiments may generate the 240 MHz MRU as three contiguous 996 tone RUs with two of the 996 tone RUs residing in a secondary 160 MHz portion of a 320 MHz EHT PPDU.

In some embodiments, the 320 MHz PPDU logic circuitry may generate an MRU for an orthogonal frequency division multiple access (OFDMA) 320 MHz EHT PPDU. In such embodiments, the MRU may comprise at least one 996 tone RU and one 484 tone RU. In some embodiments, the MRU for the OFDMA 320 MHz EHT PPDU may comprise two contiguous 996 tone RUs and the one 484 tone RU. In some embodiments, the MRU for the OFDMA 320 MHz EHT PPDU may comprise the at least one 996 tone RU contiguous with the one 484 tone RU. Note that the remainder of the 240 MHz transmission for the OFDMA 320 MHz EHT PPDU is advantageously assignable to one or more other users as allowable RUs. Furthermore, the 320 MHz PPDU logic circuitry may cause transmission of, receive, demodulate, decode, and interpret the 320 MHz EHT PPDUs as well as the medium access control frames carried in physical layer (PHY) service data units (PSDUs) of the 320 MHz EHT PPDUs.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Various embodiments may be designed to address different technical problems associated with generating 240 MHz transmissions by EHT STAs; generating non-OFDMA 240 MHz transmissions by EHT STAs; generating OFDMA 240 MHz transmissions by EHT STAs; generating multi-user (MU) non-OFDMA 240 MHz transmissions by EHT STAs; and/or the like.

Different technical problems such as those discussed above may be addressed by one or more different embodiments. Embodiments may address one or more of these problems associated with generating 240 MHz transmissions by EHT STAs. For instance, some embodiments that address problems associated with generating 240 MHz transmissions by EHT STAs may do so by one or more different technical means, such as, generating a 320 MHz EHT PPDU comprising an MRU; generation of a non-OFDMA 320 MHz EHT PPDU; generation of a non-OFDMA 320 MHz EHT PPDU, wherein the MRU comprises a 240 MHz MRU, the 240 MHz MRU comprising at least two contiguous 996 tone RUs; generation of an OFDMA 320 MHz EHT PPDU; generation of an OFDMA 320 MHz EHT PPDU, wherein the MRU comprises at least one 996 tone RU and one 484 tone RU; wherein the 240 MHz MRU comprises the at least two contiguous 996 tone RUs and a third contiguous 996 tone RU; wherein the 240 MHz MRU comprises the at least two contiguous 996 tone PPDU in a primary 160 MHz of the non-OFDMA 320 MHz EHT PPDU; wherein the 240 MHz MRU comprises the at least two contiguous 996 tone PPDU in a secondary 160 MHz of the non-OFDMA 320 MHz EHT PPDU; wherein the MRU of the OFDMA 320 MHz EHT PPDU comprises two contiguous 996 tone RUs and the one 484 tone RU; wherein the two contiguous 996 tone RUs reside in the primary 160 MHz of the OFDMA 320 MHz EHT PPDU; wherein the MRU of the OFDMA 320 MHz EHT PPDU comprises the at least one 996 tone RU contiguous with the one 484 tone RU; and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Embodiments may facilitate wireless communications in accordance with multiple standards. Some embodiments may comprise low power wireless communications like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

FIG. 1A system diagram illustrating an embodiment of a network environment for 320 MHz PPDU logic circuitry. Wireless network 1000 may include one or more user devices 1020 and one or more access points(s) (AP) 1005, which may communicate in accordance with IEEE 802.11 communication standards. The user device(s) 1020 may comprise mobile devices that are non-stationary (e.g., not having fixed locations) and/or stationary devices.

Figure 3:
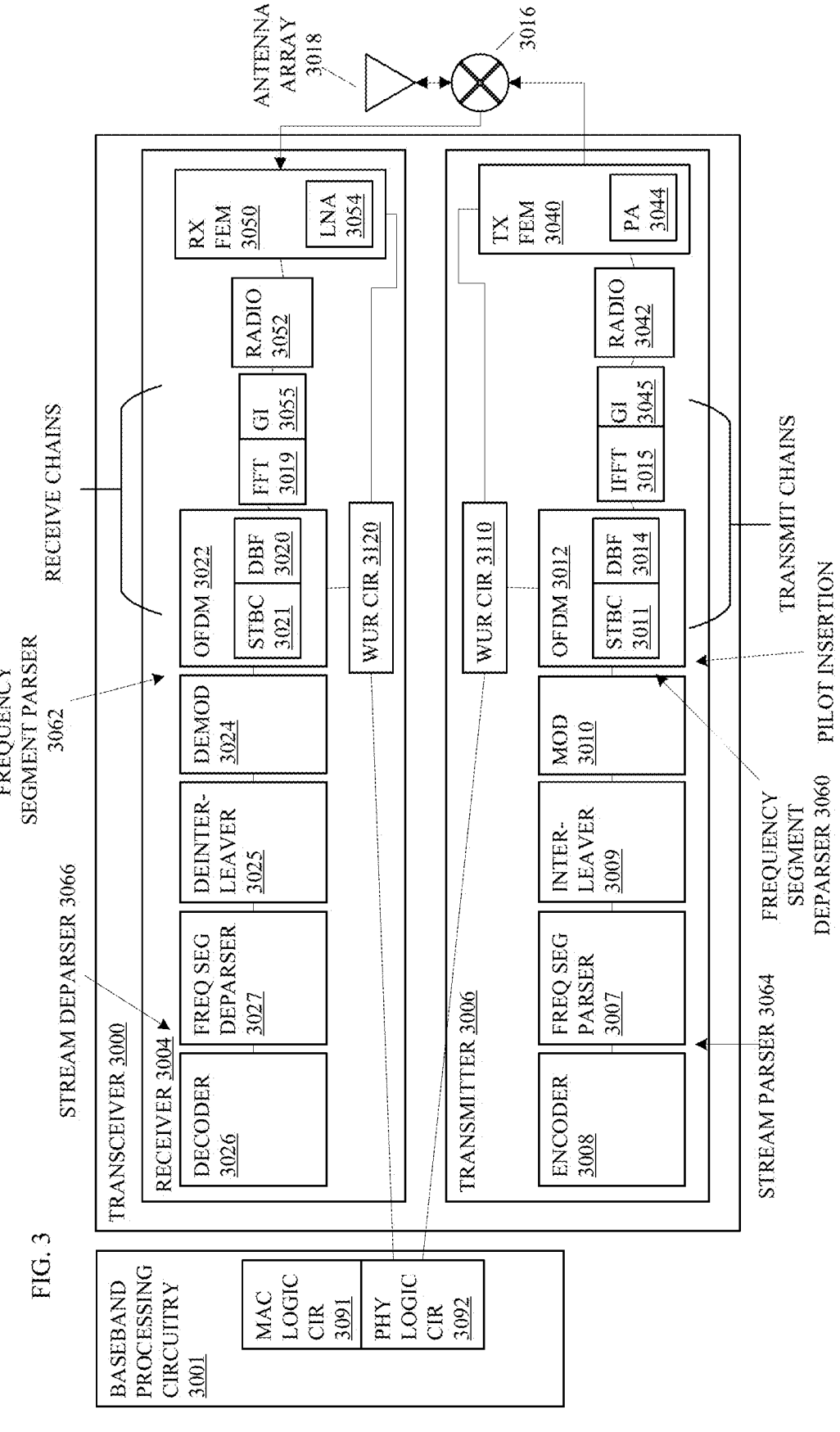
FIG. 3 depicts an embodiment of a wireless interface.

In some embodiments, the user devices 1020 and the AP 1005 may include one or more computer systems similar to that of the functional diagram of FIG. 3 and/or the example machine/system of FIGS. 5, 6, 7, and 8.

One or more illustrative user device(s) 1020 and/or AP(s) 1005 may be operable by one or more user(s) 1010. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 1020 and the AP(s) 1005 may be STAs. The one or more illustrative user device(s) 1020 and/or AP(s) 1005 may operate as a personal basic service set (PBSS) control point/access point (PCP/AP). The user device(s) 1020 (e.g., 1024, 1026, or 1028) and/or AP(s) 1005 may include any suitable processor-driven device including, but not limited to, a mobile device or a non-mobile, e.g., a static device. For example, user device(s) 1020 and/or AP(s) 1005 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless network interface, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

In some embodiments, the user device(s) 1020 and/or AP(s) 1005 may also include mesh stations in, for example, a mesh network, in accordance with one or more IEEE 802.11 standards and/or 3GPP standards.

Any of the user device(s) 1020 (e.g., user devices 1024, 1026, 1028), and AP(s) 1005 may be configured to communicate with each other via one or more communications networks 1030 and/or 1035 wirelessly or wired. The user device(s) 1020 may also communicate peer-to-peer or directly with each other with or without the AP(s) 1005. Any of the communications networks 1030 and/or 1035 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 1030 and/or 1035 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 1030 and/or 1035 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 1020 (e.g., user devices 1024, 1026, 1028) and AP(s) 1005 may include one or more communications antennas. The one or more communications antennas may be any suitable type of antennas corresponding to the communications protocols used by the user device(s) 1020 (e.g., user devices 1024, 1026 and 1028), and AP(s) 1005. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 1020 and/or AP(s) 1005.

Any of the user device(s) 1020 (e.g., user devices 1024, 1026, 1028), and AP(s) 1005 may be configured to perform directional transmission and/or directional reception in conjunction with wirelessly communicating in a wireless network. Any of the user device(s) 1020 (e.g., user devices 1024, 1026, 1028), and AP(s) 1005 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 1020 (e.g., user devices 1024, 1026, 1028), and AP(s) 1005 may be configured to perform any given directional transmission towards one or more defined transmit sectors. Any of the user device(s) 1020 (e.g., user devices 1024, 1026, 1028), and AP(s) 1005 may be configured to perform any given directional reception from one or more defined receive sectors.

MIMO beamforming in a wireless network may be accomplished using RF beamforming and/or digital beamforming. In some embodiments, in performing a given MIMO transmission, user devices 1020 and/or AP(s) 1005 may be configured to use all or a subset of its one or more communications antennas to perform MIMO beamforming.

Any of the user devices 1020 (e.g., user devices 1024, 1026, 1028), and AP(s) 1005 may include any suitable radio and/or transceiver for transmitting and/or receiving radio frequency (RF) signals in the bandwidth and/or channels corresponding to the communications protocols utilized by any of the user device(s) 1020 and AP(s) 1005 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax, 802.11be), 5 GHz channels (e.g. 802.11n, 802.11ac, 802.11ax, 802.11be), 6 GHz (e.g., 802.11be), or 60 GHZ channels (e.g. 802.11ad, 802.11ay) or 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1A, AP 1005 may communicate a 320 MHz EHT PPDU 1042 with one or more user devices 1020. For instance, the AP 1005 may transmit a MAC MU-ready to send (RTS) frame in an EHT MU PPDU to two or more user devices 1020 via orthogonal frequency multiple access (OFDMA) communications. The EHT MU PPDU may include a multi-RU (MRU) having at least one 996 tone RU and one 484 tone RU.

The one or more user devices 1020 may receive the EHT MU PPDU, demodulate the PPDU, de-interleave the PPDU, decode the PPDU, determine a scrambler initialization bit sequence from the data field of the EHT MU PPDU, and descramble the MAC MU-RTS from the data field of the EHT MU PPDU.

The one or more user devices 1020 may pass the PSDU from the EHT MU PPDU to the MAC layer as an MSDU and baseband processing circuitry executing code for the MAC layer may deparse and interpret the MAC frame in the MSDU to determine how to proceed or respond in view of receipt of the EHT MU PPDU.

Based on receipt of the MU-RTS, each of the user devices 1020 may determine to respond to the MU-RTS with a CTS a short interframe space (SIFS) after receipt of the MU-RTS. The user devices 1020 may each transmit a MAC CTS in a non-HT PPDU to the AP 1005.

Figure 1B:
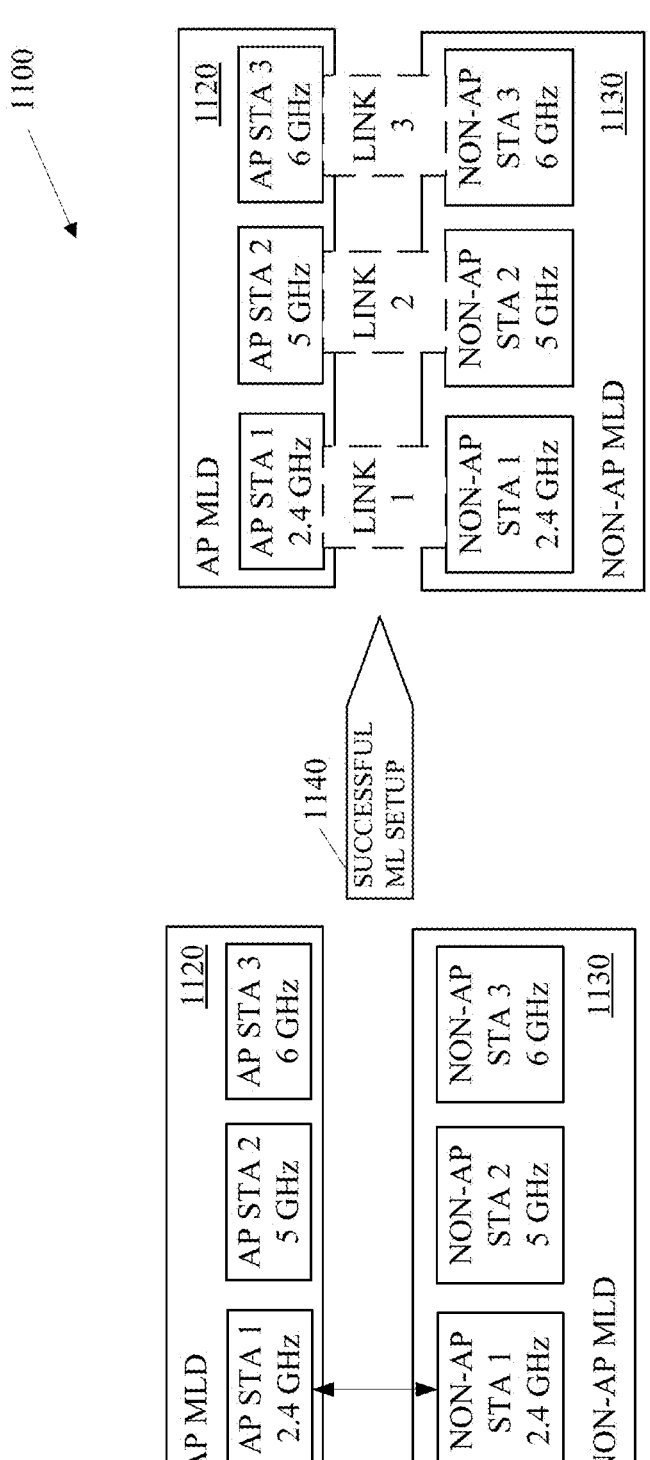
FIG. 1B depicts an embodiment illustrating interactions between stations (STAs) to establish multiple links between an access point (AP) multi-link device (MLD) and a non-AP MLD.

In FIG. 1B, the AP MLD 1120 has three affiliated APs: AP 1 operates on 2.4 GHz band, AP 2 operates on 5 GHz band, and AP 3 operates on 6 GHz band. The non-AP STA 1 affiliated with the non-AP MLD 1130 sends an association request frame (or a reassociation request frame) to AP 1 affiliated with the AP MLD 1120. The association request frame may have a TA field set to the MAC address of the non-AP STA 1 and an RA field set to the MAC address of the AP 1. The association request frame may include complete information of non-AP STA 1, non-AP STA 2, and non-AP STA 3 to request three links to be setup (one link between AP 1 and non-AP STA 1, one link between AP 2 and non-AP STA 2, and one link between AP 3 and non-AP STA 3) and an ML element that indicates the MLD MAC address of the non-AP MLD 1130.

AP 1 affiliated with the AP MLD 1120 may send an association response frame to non-AP STA 1 affiliated with the non-AP MLD 1130 with a TA field of the association response frame is set to the MAC address of the AP 1 and an RA field of the association response frame set to the MAC address of the non-AP STA 1, to indicate successful multi-link setup 1140. The association response frame may include complete information of AP 1, AP 2, and AP 3 and an ML element that indicates the MLD MAC address of the AP MLD 1120. After successful ML setup between the non-AP MLD 1130 and the AP MLD 1120, three links are setup (LINK 1 between AP 1 and non-AP STA 1, LINK 2 between AP 2 and non-AP STA 2, and LINK 3 between AP 3 and non-AP STA 3).

In some embodiments, the non-AP MLD 1130 may associate with less than all the links available from the AP MLD 1120 for various reasons. For instance, in some embodiments, the non-AP MLD 1130 may only be capable of establishing two of the links. In some embodiments, the non-AP MLD 1130 may establish a link with a second AP MLD because the second AP MLD may have a better signal-to-noise ratio associated with one or more links and be associated with the same ESS. In some embodiments, the non-AP MLD 1130 may establish a link with a second AP MLD because the second AP MLD may be associated with a different ESS or a BSS that is not associated with the BSS of the AP MLD 1120.

Figure 1C:
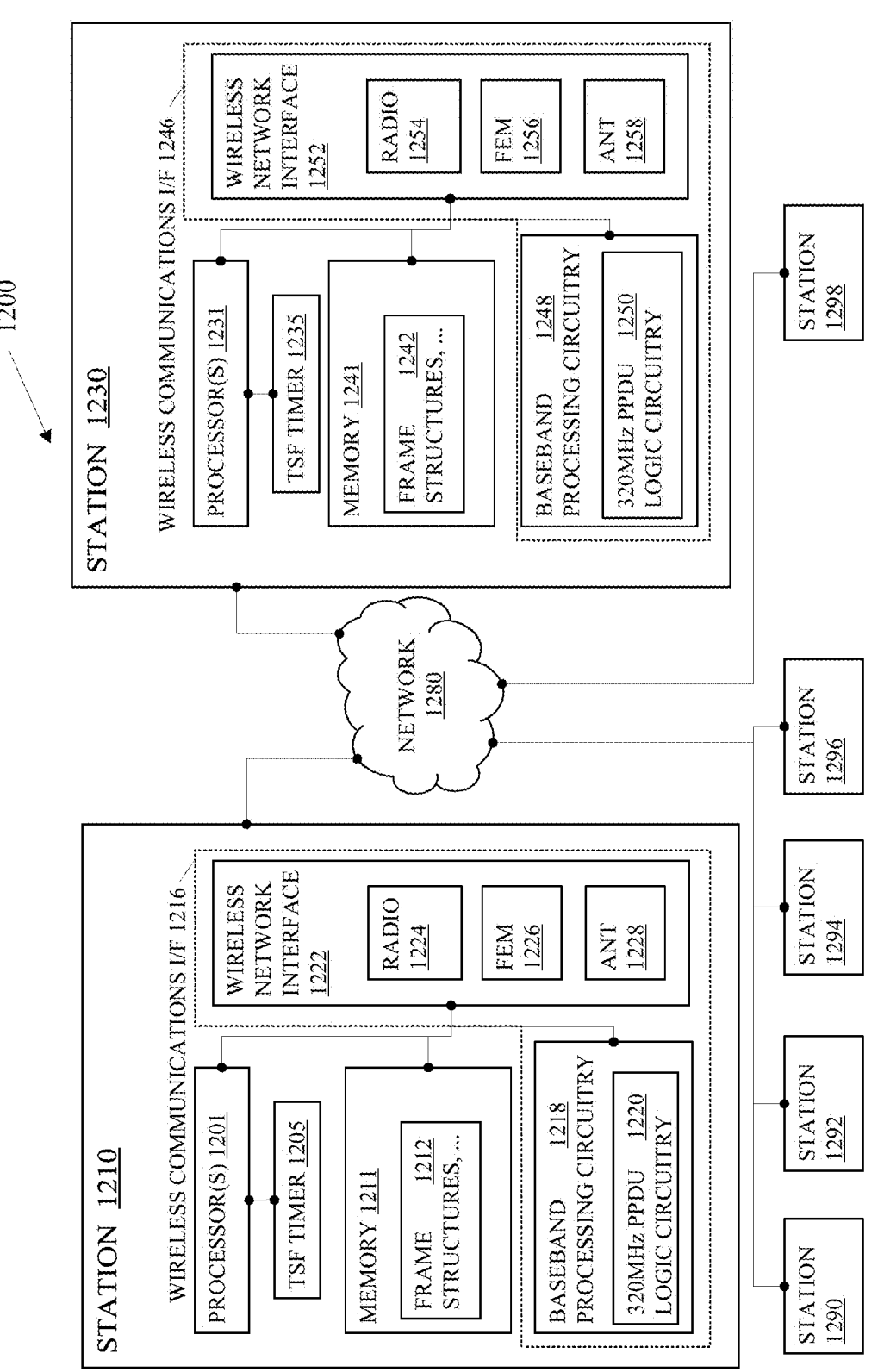
FIG. 1C depicts an embodiment of a system including multiple STAs to implement 320 MHz PPDU logic circuitry, in accordance with one or more example embodiments.

FIG. 1C depicts an embodiment of a system 1200 to transmit or receive as well as to generate, transmit, receive, decode, and interpret transmissions between an AP station 1210 and multiple STAs 1230, 1290, 1292, 1294, 1296, and 1298, associated with the AP station 1210. The AP STA 1210 may be wired and wirelessly connected to each of the STAs 1230, 1290, 1292, 1294, 1296, and 1298.

In some embodiments, the STAs 1210 and 1230 may include one or more computer systems similar to that of the example machines/systems of FIGS. 5, 6, 7, and 8.

Each STA 1230, 1290, 1292, 1294, 1296, and 1298 may associate with the AP STA 1210 via at least one link. After associating with the AP STA 1210, the AP STA 1210 may buffer data to downlink (DL) to the STAs 1230, 1290, 1292, 1294, 1296, and 1298 and each STA 1230, 1290, 1292, 1294, 1296, and 1298 may collect data to uplink (UL) to the AP STA 1210.

Periodically, the AP STA 1210 may transmit a significant amount of data to STA 1230 via a MAC data frame in a 320 MHZ EHT PPDU addressed to the STA 1230 with the MAC address for STA 1230 on a 6 GHz link as the target transmitter address (TA). Note that if the STA 1230 is associated with the AP STA 1210 by more than on link, the STA 1230 and the AP 1210 may bother have specific MAC or other addresses associated with each of the links. For instance, the STA 1230 may be associated with the AP STA 1210 via a 2.4 GHz link, a 5, GHz link, and a 6 GHz link. Thus, the TA for the STA 1230 may be a MAC address that is only associated with the 6 GHz link.

The initiate a transfer of the data, the AP STA 1210 may transmit an RTS trigger frame as an EHT PPDU, the STA 1230 may respond with a CTS, and the AP STA 1210 may transmit the large amount of data in a 320 MHz EHT PPDU.

In some embodiments, the STA 1230 may limit receipt of 320 MHz EHT PPDUs to receipt of a 240 MHz bandwidth transmission on an MRU of 240 MHz via an indication in a capabilities field in, e.g., an association request frame. In other embodiments, the AP STA may determine to transmit a 240 MHz transmission due to the amount of data being transferred or based on interference detected on one of the RU's in the 320 MHz channel.

The AP STA 1210 may generate the 320 MHz PPDU as a non-OFDMA EHT PPDU and select a 240 MHz MRU for transmission of the large amount of data. The baseband processing circuitry 1218 of the AP STA 1210 may pass the PSDU along with parameters for the non-OFDMA 320 MHz EHT PPDU and the PHY may transmit the non-OFDMA 320 MHz EHT PPDU on a 240 MHz bandwidth of the non-OFDMA 320 MHz EHT PPDU associated with the 240 MHz MRU.

In other embodiments, the AP STA 1210 may generate an OFDMA 320 GHz MU PPDU with an MRU of 200 MHz (2×996 tone RUs plus 484 tone RU) and associate a 40 MHz (484 tone RU) with the STA 1290 to transmit data to the STA 1290 as a second user.

In some embodiments, both of the one or more of STAs 1230 and 1290 may transmit the non-HT PPDUs on their respective RUs addressed to the AP STA 1210 with MAC acknowledgement (ACK) frames to confirm receipt of the MAC data frames.

The AP STA 1210 comprise processor(s) 1201 and memory 1211. The processor(s) 1201 may comprise any data processing device such as a microprocessor, a microcontroller, a state machine, and/or the like, and may execute instructions or code in the memory 1211. The memory 1211 may comprise a storage medium such as Dynamic Random Access Memory (DRAM), read only memory (ROM), buffers, registers, cache, flash memory, hard disk drives, solid-state drives, or the like. The memory 1211 may store 1212 the frames, frame structures, frame headers, etc., and may also comprise code to generate, scramble, encode, decode, parse, and interpret MAC frames and/or PHY frames and PPDUs.

The baseband processing circuitry 1218 may comprise a baseband processor and/or one or more circuits to implement a station management entity. In some embodiments, the station management entity may interact with a MAC layer management entity to perform MAC layer functionality and a PHY management entity to perform PHY functionality. In such embodiments, the baseband processing circuitry 1218 may interact with processor(s) 1201 to coordinate higher layer functionality with MAC layer and PHY functionality.

In some embodiments, the baseband processing circuitry 1218 may interact with one or more analog devices to perform PHY functionality such as scrambling, encoding, modulating, and the like. In other embodiments, the baseband processing circuitry 1218 may execute code to perform one or more of the PHY functionality such as scrambling, encoding, modulating, and the like.

The MAC layer functionality may execute MAC layer code stored in the memory 1211. In further embodiments, the MAC layer functionality may interface the processor(s) 1201.

The MAC logic functionality may communicate with the PHY to transmit a MAC frame such as an MU-RTS in a PHY frame such as an EHT MU PPDU to the station 1230. The MAC functionality may generate frames such as management, data, control frames, and extension frame as well as parameters by which the PHY may transmit the MAC frames.

The PHY may prepare the MAC frame for transmission by, e.g., determining a preamble to prepend to a MAC frame to create a PHY frame. The preamble may include one or more short training field (STF) values, long training field (LTF) values, and signal (SIG) field values. A wireless network interface 1222 or the baseband processing circuitry 1218 may prepare the PHY frame as a scrambled, encoded, modulated PPDU in the time domain signals for the radio 1224. Furthermore, the TSF timer 1205 may provide a timestamp value to indicate the time at which the PPDU is transmitted.

After processing the PHY frame, a radio 1225 may impress digital data onto subcarriers of RF frequencies for transmission by electromagnetic radiation via elements of an antenna array or antennas 1224 and via the network 1280 to a receiving STA such as the STA 1230.

The wireless network I/F 1222 also comprises a receiver. The receiver receives electromagnetic energy, extracts the digital data, and the analog PHY and/or the baseband processor 1218 decodes a PHY frame and a MAC frame from a PPDU.

The STA 1230 may receive the MU-RTS in the EHT PPDU from the STA 1210 via the network 1280. The STA 1230 may comprise processor(s) 1231 and memory 1241. The processor(s) 1231 may comprise any data processing device such as a microprocessor, a microcontroller, a state machine, and/or the like, and may execute instructions or code in the memory 1241. The memory 1241 may comprise a storage medium such as Dynamic Random Access Memory (DRAM), read only memory (ROM), buffers, registers, cache, flash memory, hard disk drives, solid-state drives, or the like. The memory 1241 may store 1242 the frames, frame structures, frame headers, etc., and may also comprise code to generate, scramble, encode, decode, parse, and interpret MAC frames and/or PHY frames and PPDUs.

The baseband processing circuitry 1248 may comprise a baseband processor and/or one or more circuits to implement a station management entity and the station management entity may interact with a MAC layer management entity to perform MAC layer functionality and a PHY management entity to perform PHY functionality. In such embodiments, the baseband processing circuitry 1248 may interact with processor(s) 1231 to coordinate higher layer functionality with MAC layer and PHY functionality.

In some embodiments, the baseband processing circuitry 1218 may interact with one or more analog devices to perform PHY functionality such as descrambling, decoding, demodulating, and the like. In other embodiments, the baseband processing circuitry 1218 may execute code to perform one or more of the PHY functionality such as descrambling, decoding, demodulating, and the like.

The STA 1230 may receive the EHT PPDU at the antennas 1258, which pass the signals along to the FEM 1256.

The FEM 1256 may amplify and filter the signals and pass the signals to the radio 1254. The radio 1254 may filter the carrier signals from the signals and determine if the signals represent a PPDU. If so, analog circuitry of the wireless network I/F 1252 or physical layer functionality implemented in the baseband processing circuitry 1248 may demodulate, decode, descramble, etc. the PPDU. The baseband processing circuitry 1248 may identify, parse, and interpret the MAC MU-RTS from the PSDU of the EHT PPDU.

Figure 1D:
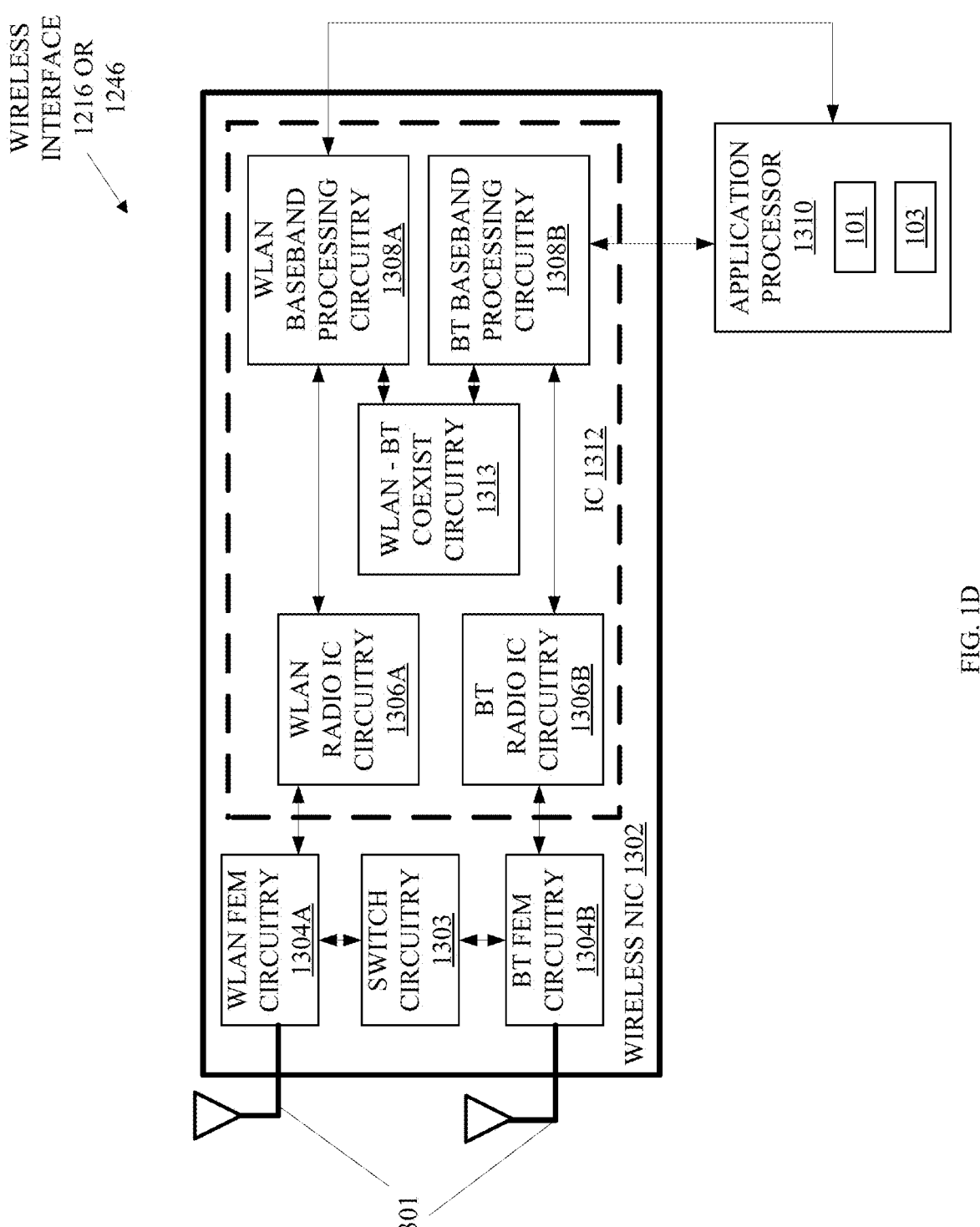
FIG. 1D illustrates an embodiment of a wireless interface for STAs, such as the STAs depicted in FIGS. 1A-C, to implement 320 MHz PPDU logic circuitry.

FIG. 1D is a block diagram of a radio architecture such as the wireless communications I/F 1216 and 1246 in accordance with some embodiments that may be implemented in any one of the example AP 100 and/or the example STA 102 of FIG. 1. Radio architecture 1216 and 1246 may include radio front-end module (FEM) circuitry 1304_a-b_, radio IC circuitry 1306_a-b_ and baseband processing circuitry 1308_a-b_. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1304_a-b_ may include a WLAN or Wi-Fi FEM circuitry 1304_a_ and a Bluetooth (BT) FEM circuitry 1304_b_. The WLAN FEM circuitry 1304_a_ may include a receive signal path comprising circuitry configured to operate on WLAN RF signals received from one or more antennas 1301, to amplify the received signals and to provide the amplified versions of the received signals to the WLAN radio IC circuitry 1306_a_ for further processing. The BT FEM circuitry 1304_b_ may include a receive signal path which may include circuitry configured to operate on BT RF signals received from one or more antennas 1301, to amplify the received signals and to provide the amplified versions of the received signals to the BT radio IC circuitry 1306_b_ for further processing. FEM circuitry 1304_a_ may also include a transmit signal path which may include circuitry configured to amplify WLAN signals provided by the radio IC circuitry 1306_a_ for wireless transmission by one or more of the antennas 1301. In addition, FEM circuitry 1304_b_ may also include a transmit signal path which may include circuitry configured to amplify BT signals provided by the radio IC circuitry 1306_b_ for wireless transmission by the one or more antennas. In the embodiment of FIG. 1D, although FEM 1304_a_ and FEM 1304_b_ are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1306_a-b_ as shown may include WLAN radio IC circuitry 1306_a_ and BT radio IC circuitry 1306_b_. The WLAN radio IC circuitry 1306_a_ may include a receive signal path which may include circuitry to down-convert WLAN RF signals received from the FEM circuitry 1304_a_ and provide baseband signals to WLAN baseband processing circuitry 1308_a_. BT radio IC circuitry 1306_b_ may in turn include a receive signal path which may include circuitry to down-convert BT RF signals received from the FEM circuitry 1304_b_ and provide baseband signals to BT baseband processing circuitry 1308_b_. WLAN radio IC circuitry 1306_a_ may also include a transmit signal path which may include circuitry to up-convert WLAN baseband signals provided by the WLAN baseband processing circuitry 1308_a_ and provide WLAN RF output signals to the FEM circuitry 1304_a_ for subsequent wireless transmission by the one or more antennas 1301. BT radio IC circuitry 1306_b_ may also include a transmit signal path which may include circuitry to up-convert BT baseband signals provided by the BT baseband processing circuitry 1308_b_ and provide BT RF output signals to the FEM circuitry 1304_b_ for subsequent wireless transmission by the one or more antennas 1301. In the embodiment of FIG. 1D, although radio IC circuitries 1306_a_ and 1306_b_ are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1308_a-b_ may include a WLAN baseband processing circuitry 1308_a_ and a BT baseband processing circuitry 1308_b_. The WLAN baseband processing circuitry 1308_a_ may include a memory, such as, for example, a set of RAM arrays in a Fast Fourier Transform or Inverse Fast Fourier Transform block (not shown) of the WLAN baseband processing circuitry 1308_a_. Each of the WLAN baseband circuitry 1308_a_ and the BT baseband circuitry 1308_b_ may further include one or more processors and control logic to process the signals received from the corresponding WLAN or BT receive signal path of the radio IC circuitry 1306_a-b_, and to also generate corresponding WLAN or BT baseband signals for the transmit signal path of the radio IC circuitry 1306_a-b_. Each of the baseband processing circuitries 1308_a_ and 1308_b_ may further include physical layer (PHY) and medium access control layer (MAC) circuitry, and may further interface with a device for generation and processing of the baseband signals and for controlling operations of the radio IC circuitry 1306_a-b_.

Referring still to FIG. 1D, according to the shown embodiment, WLAN-BT coexistence circuitry 1313 may include logic providing an interface between the WLAN baseband circuitry 1308_a_ and the BT baseband circuitry 1308_b_ to enable use cases requiring WLAN and BT coexistence. In addition, a switch circuitry 1303 may be provided between the WLAN FEM circuitry 1304_a_ and the BT FEM circuitry 1304_b_ to allow switching between the WLAN and BT radios according to application needs. In addition, although the antennas 1301 are depicted as being respectively connected to the WLAN FEM circuitry 1304_a_ and the BT FEM circuitry 1304_b_, embodiments include within their scope the sharing of one or more antennas as between the WLAN and BT FEMs, or the provision of more than one antenna connected to each of FEM 1304_a_ or 1304_b_.

In some embodiments, the front-end module circuitry 1304_a-b_, the radio IC circuitry 1306_a-b_, and baseband processing circuitry 1308_a-b_ may be provided on a single radio card, such as wireless network interface card (NIC) 1302. In some other embodiments, the one or more antennas 1301, the FEM circuitry 1304_a-b_ and the radio IC circuitry 1306_a-b_ may be provided on a single radio card. In some other embodiments, the radio IC circuitry 1306_a-b_ and the baseband processing circuitry 1308_a-b_ may be provided on a single chip or integrated circuit (IC), such as IC 1312.

In some embodiments, the wireless NIC 1302 may include a WLAN radio card and may be configured for Wi-Fi communications, although the scope of the embodiments is not limited in this respect. In some of these embodiments, the radio architecture 1216 and 1246 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1216 and 1246 may be part of a Wi-Fi communication station (STA) such as a wireless access point (AP), a base station or a mobile device including a Wi-Fi device. In some of these embodiments, radio architecture 1216 and 1246 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2020, 802.11ay, 802.11ba, 802.11ax, and/or 802.11be standards and/or proposed specifications for WLANs, although the scope of embodiments is not limited in this respect. Radio architecture 1216 and 1246 may also be suitable to transmit and/or receive communications in accordance with other techniques and standards.

In some embodiments, the radio architecture 1216 and 1246 may be configured for high-efficiency Wi-Fi (HEW) communications in accordance with the IEEE 802.11ax standard. In these embodiments, the radio architecture 1216 and 1246 may be configured to communicate in accordance with an OFDMA technique, although the scope of the embodiments is not limited in this respect.

In some other embodiments, the radio architecture 1216 and 1246 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1D, the BT baseband circuitry 1308b may be compliant with a Bluetooth (BT) connectivity standard such as Bluetooth, Bluetooth 8.0 or Bluetooth 6.0, or any other iteration of the Bluetooth Standard.

In some embodiments, the radio architecture 1216 and 1246 may include other radio cards, such as a cellular radio card configured for cellular (e.g., 5GPP such as LTE, LTE-Advanced or 7G communications).

In some IEEE 802.11 embodiments, the radio architecture 1216 and 1246 may be configured for communication over various channel bandwidths including bandwidths having center frequencies of about 2.4 GHz, 5 GHz, and 6 GHz. The various bandwidths may include bandwidths of about 20 MHz, 40 MHz, 80 MHz, 160 MHz, 240 MHz, and 320 MHz with contiguous or non-contiguous bandwidths having increments of 20 MHz, 40 MHz, 80 MHz, 160 MHz, 240 MHz, and 320 MHz. The scope of the embodiments is not limited with respect to the above center frequencies however.

Figures 1E, 1F:
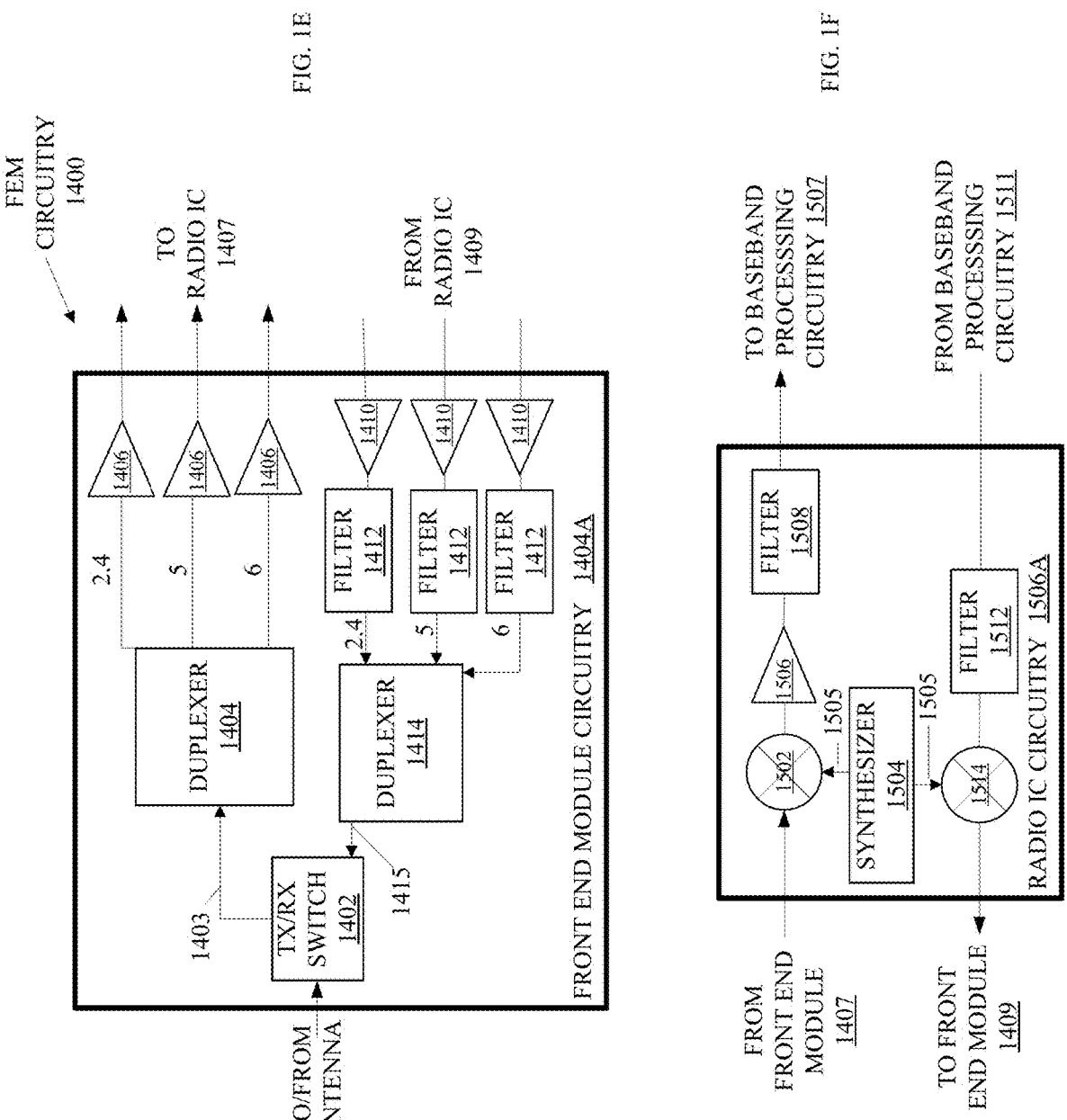
FIG. 1E illustrates an embodiment of front end module (FEM) circuitry of a wireless interface for STAs, such as the STAs in FIGS. 1A-C, to implement 320 MHz PPDU logic circuitry.
FIG. 1F illustrates an embodiment of radio integrated circuit (IC) circuitry of a wireless interface for STAs, such as the STAs in FIGS. 1A-C, to implement 320 MHz PPDU logic circuitry.

FIG. 1E illustrates WLAN FEM circuitry 1304a in accordance with some embodiments. Although the example of FIG. 1E is described in conjunction with the WLAN FEM circuitry 1304a, the example of FIG. 1E may be described in conjunction with other configurations of BT FEM circuitry.

In some embodiments, the FEM circuitry 1304a may include a TX/RX switch 1402 to switch between transmit mode and receive mode operation. The FEM circuitry 1304a may include a receive signal path and a transmit signal path. The receive signal path of the FEM circuitry 1304a may include a low-noise amplifier (LNA) 1406 to amplify received RF signals 1403 and provide the amplified received RF signals 1407 as an output (e.g., to the radio IC circuitry 1306a-b (FIG. 1D)). The transmit signal path of the circuitry 1304a may include a power amplifier (PA) to amplify input RF signals 1409 (e.g., provided by the radio IC circuitry 1306a-b), and one or more filters 1412, such as band-pass filters (BPFs), low-pass filters (LPFs) or other types of filters, to generate RF signals 1415 for subsequent transmission (e.g., by one or more of the antennas 1301 (FIG. 1D)) via an example duplexer 1414.

In some dual-mode embodiments for Wi-Fi communication, the FEM circuitry 1304a may be configured to operate in the 2.4 GHz frequency spectrum, the 5 GHz frequency spectrum, or the 6 GHz frequency spectrum. In these embodiments, the receive signal path of the FEM circuitry 1304a may include a receive signal path duplexer 1404 to separate the signals from each spectrum as well as provide a separate LNA 1406 for each spectrum as shown. In these embodiments, the transmit signal path of the FEM circuitry 1304a may also include a power amplifier 1410 and a filter 1412, such as a BPF, an LPF or another type of filter for each frequency spectrum and a transmit signal path duplexer 1404 to provide the signals of one of the different spectrums onto a single transmit path for subsequent transmission by the one or more of the antennas 1301 (FIG. 1D). In some embodiments, BT communications may utilize the 2.4 GHz signal paths and may utilize the same FEM circuitry 1304a as the one used for WLAN communications.

FIG. 1F illustrates radio IC circuitry 1306a in accordance with some embodiments. The radio IC circuitry 1306a is one example of circuitry that may be suitable for use as the WLAN or BT radio IC circuitry 1306a/1306b (FIG. 1D), although other circuitry configurations may also be suitable. Alternatively, the example of FIG. 1F may be described in conjunction with the example BT radio IC circuitry 1306b.

In some embodiments, the radio IC circuitry 1306a may include a receive signal path and a transmit signal path. The receive signal path of the radio IC circuitry 1306a may include at least mixer circuitry 1502, such as, for example, down-conversion mixer circuitry, amplifier circuitry 1506 and filter circuitry 1508. The transmit signal path of the radio IC circuitry 1306a may include at least filter circuitry 1512 and mixer circuitry 1514, such as, for example, up-conversion mixer circuitry. Radio IC circuitry 1306a may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 1F illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304a-b (FIG. 1D) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308*a*-*b* (FIG. 1D) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1409 for the FEM circuitry 1304*a*-*b*. The baseband signals 1511 may be provided by the baseband processing circuitry 1308*a*-*b* and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or up-conversion respectively with the help of synthesizer 1504. In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct up-conversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1407 from FIG. 1F may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 1F). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 1E) may comprise a balanced signal, although the scope of the embodiments is not limited in this respect. The I and Q baseband output signals may be provided to low-noise amplifier, such as amplifier circuitry 1506 (FIG. 1F) or to filter circuitry 1508 (FIG. 1F).

In some embodiments, the output baseband signals 1507 and the input baseband signals 1511 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1504 may be provided by a voltage controlled oscillator (VCO), although that is not a requirement. A divider control input may further be provided by either the baseband processing circuitry 1308*a*-*b* (FIG. 1D) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. The application processor 1310 may include, or otherwise be connected to, one of the example secure signal converter 101 or the example received signal converter 103 (e.g., depending on which device the example radio architecture is implemented in).

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

Figure 1G:
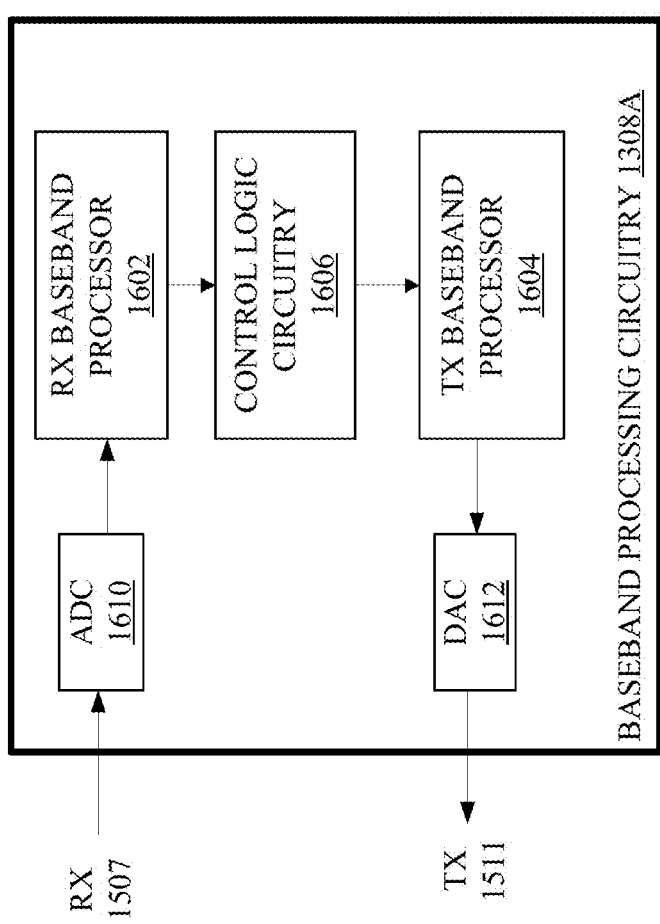
FIG. 1G illustrates an embodiment of baseband processing circuitry of a wireless interface for STAs, such as the STAs in FIGS. 1A-C, to implement 320 MHz PPDU logic circuitry.

FIG. 1G illustrates a functional block diagram of baseband processing circuitry 1308*a* in accordance with some embodiments. The baseband processing circuitry 1308*a* is one example of circuitry that may be suitable for use as the baseband processing circuitry 1308*a* (FIG. 1D), although other circuitry configurations may also be suitable. Alternatively, the example of FIG. 1F may be used to implement the example BT baseband processing circuitry 1308*b* of FIG. 1D.

The baseband processing circuitry 1308*a* may include a receive baseband processor (RX BBP) 1602 for processing receive baseband signals 1509 provided by the radio IC circuitry 1306*a*-*b* (FIG. 1D) and a transmit baseband processor (TX BBP) 1604 for generating transmit baseband signals 1511 for the radio IC circuitry 1306*a*-*b*. The baseband processing circuitry 1308a may also include control logic 1606 for coordinating the operations of the baseband processing circuitry 1308a.

In some embodiments (e.g., when analog baseband signals are exchanged between the baseband processing circuitry 1308a-b and the radio IC circuitry 1306a-b), the baseband processing circuitry 1308a may include ADC 1610 to convert analog baseband signals 1609 received from the radio IC circuitry 1306a-b to digital baseband signals for processing by the RX BBP 1602. In these embodiments, the baseband processing circuitry 1308a may also include DAC 1612 to convert digital baseband signals from the TX BBP 1604 to analog baseband signals 1611.

In some embodiments that communicate OFDM signals or OFDMA signals, such as through baseband processor 1308a, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1D, in some embodiments, the antennas 1301 (FIG. 1D) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1301 may each include a set of phased-array antennas, although embodiments are not so limited.

Although the radio architecture 1216 and 1246 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

FIGS. 2A-2C illustrate embodiments of channels and subchannels (or resource units) that can facilitate multiple transmissions simultaneously along with transmission of an OFDMA PPDU and can facilitate a single user (SU) with transmission of an orthogonal frequency multiplexer (OFDM) PPDU. Note that OFDM transmissions are examples of non-OFDMA transmissions. Note also that the RUs shown in FIG. 2C are illustrative of the functionality even though the RUs associated with the 320 MHz EHT PPDUs herein are larger RUs.

FIG. 2A illustrates an embodiment of transmissions 2010 between four stations and an AP on four different subchannels (or RUs) of a channel via OFDMA. Grouping subcarriers into groups of resource units is referred to as subchannelization. Subchannelization defines subchannels that can be allocated to stations depending on their channel conditions and service requirements. An OFDMA system may also allocate different transmit powers to different subchannels.

In the present embodiment, the OFDMA STA1, OFDMA STA2, OFDMA STA3, and OFDMA STA4 may represent transmissions on a four different subchannels of the channel. For instance, transmissions 2010 may represent an 80 MHz channel with four 20 MHz bandwidth PPDUs using frequency division multiple access (FDMA). Such embodiments may include, e.g., 1 PPDU per 20 MHz bandwidth, 2 PPDU in a 40 MHz bandwidth, and 4 PPDUs in an 80 MHz bandwidth. As a comparison, FIG. 2B illustrates an embodiment of an orthogonal frequency division multiplexing (OFDM) transmission 2015 for the same channel as FIG. 2A. The OFDM transmission 2015 may use the entire channel bandwidth.

FIG. 2C illustrates an embodiment of a 20 Megahertz (MHz) bandwidth 2020 on a channel that illustrates different resource unit (RU) configurations 2022, 2024, 2026, and 2028. In OFDMA, for instance, an OFDM symbol is constructed of subcarriers, the number of which is a function of the PPDU (also referred to as the PHY frame) bandwidth. There are several subcarrier types: 1) Data subcarriers which are used for data transmission; 2) Pilot subcarriers which are utilized for phase information and parameter tracking; and 3) unused subcarriers which are not used for data/pilot transmission. The unused subcarriers are the direct current (DC) subcarrier, the Guard band subcarriers at the band edges, and the Null subcarriers.

The RU configuration 2022 illustrates an embodiment of nine RUs that each include 26 tones (or subcarriers) for data transmission including the two sets of 13 tones on either side of the DC. The RU configuration 2024 illustrates the same bandwidth divided into 5 RUs including four RUs with 52 tones and one RU with 26 tones about the DC for data transmission. The RU configuration 2026 illustrates the same bandwidth divided into 3 RUs including two RUs with 106 tones and one RU with 26 tones about the DC for data transmission. And the RU configuration 2028 illustrates the same bandwidth divided into 2 RUs including two RUs with 242 tones about the DC for data transmission. Embodiments may be capable of additional or alternative bandwidths such as such as 40 MHz, 80 MHz, 160 MHz, 240 MHz, and 320 MHz. Many embodiments support RUs of 26-tone RU, 52-tone RU, 106-tone RU, 242-tone RU, 484-tone RU, 996-tone RU, 2×996-tone RU, and 4×996-tone RU. In some embodiments, RUs that are the same size or larger than 242-tone RUs are defined as large size RUs and RUs that are smaller than 242-tones RUs are defined as small size RUs. In some embodiments, small size RUs can only be combined with small size RUs to form small size MRUs. In some embodiments, large size RUs can only be combined with large size RUs to form large size MRUs.

Figures 2D, 2E, 2F:
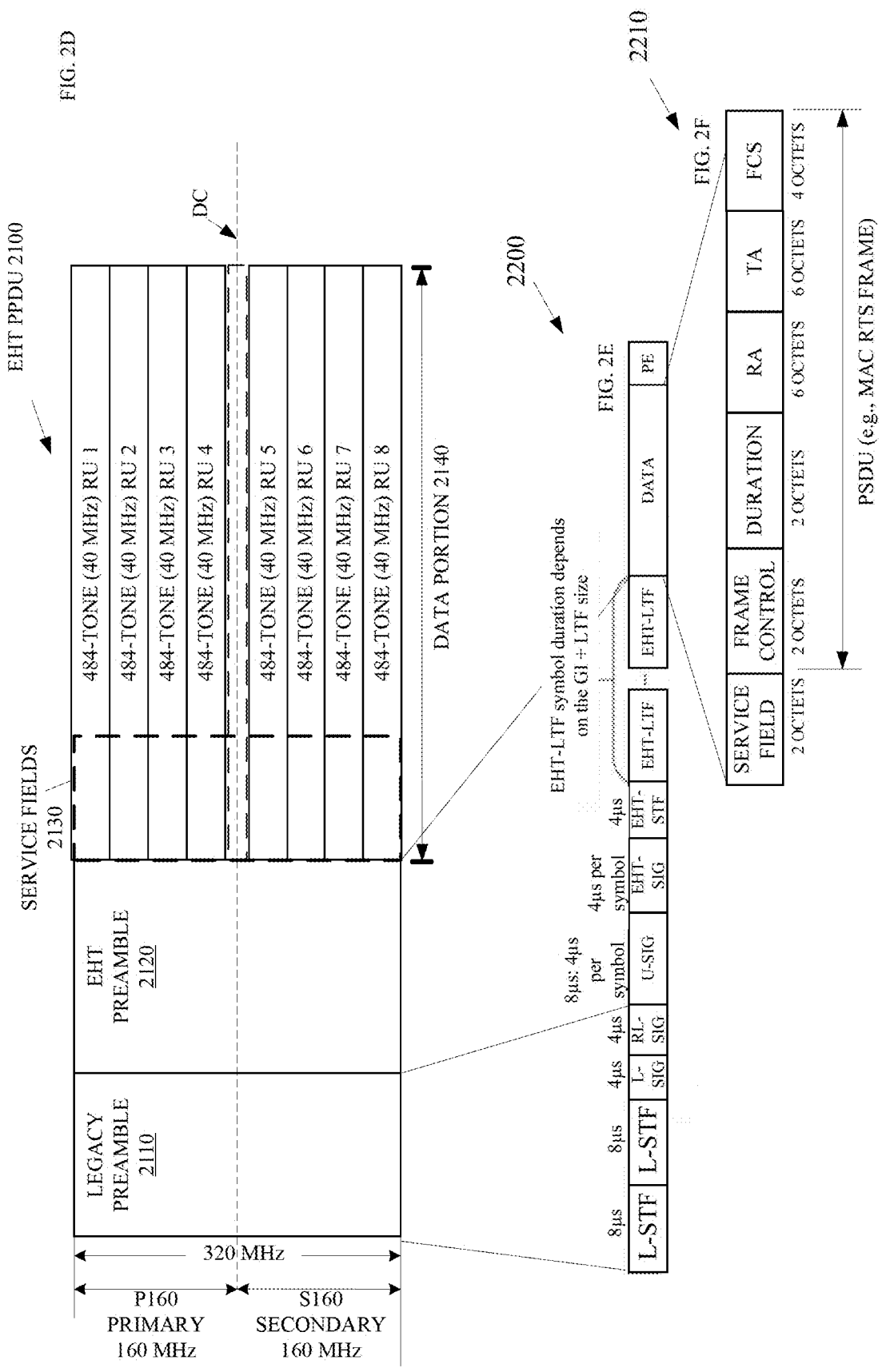
FIG. 2D depicts an embodiment of an IEEE 802.11be extremely high throughput (EHT) multi-user (MU) physical layer protocol data unit (PPDU) transmitted on an orthogonal frequency-division multiple access (OFDMA) modulated signal.
FIG. 2E depicts another embodiment of an IEEE 802.11be EHT MU PPDU.
FIG. 2F depicts an embodiment of a data field of an IEEE 802.11be EHT MU PPDU including a service field and a medium access control (MAC) RTS frame.

FIG. 2D illustrates an embodiment of a EHT PPDU 2100 in the form of an 802.11, multi-user, orthogonal frequency division multiple access (OFDMA) packet that is capable of multiple transmissions on different RUs of a 320 MHz channel. In some embodiments, the baseband processing circuitry, such as the baseband processing circuitry 1218 in FIG. 1C, may transmit an MU OFDMA transmission that multiplexes, e.g., IEEE 802.11be or 802.11ax transmissions on the same carrier frequency (e.g., 2.4 GHz, 5 GHz, or 6 GHz) within the same MU OFDMA packet. In other words, the PHY transmits multiple different packets on different RUs or frequency sub-bands within the wideband channel simultaneously. In some embodiments, the EHT PPDU 2100 may comprise an MU-RTS trigger frame to identify a transmission opportunity (TxOP) for the target STAs or initiate a beamforming procedure for the target STAs.

In some embodiments, the EHT PPDU 2100 may comprise a non-OFDMA transmission (such as an OFDM transmission) and may only transmit a single, e.g., 240 MHz transmission on an MRU that is a combination of less than all of the RUs shown. Note that while all RUs shown in EHT PPDU are 484 tone RUs (40 MHz), other EHT PPDUs may use combinations of different size RUs such as combinations of one or more of 484-tone RUs, 996-tone RUs, and 2×996-tone RUs, and 4×996-tone RUs that comprise up to 320 MHz.

The EHT PPDU 2100 may comprise a legacy preamble 2110 to notify other devices in the vicinity of the source STA, such as an AP STA, that the 320 MHz channel is in use for a duration included in the legacy preamble 2110. The EHT PPDU 2100 may also comprise an EHT preamble 2120 to identify a subsequent EHT transmission as well as the one or more STAs that are the target(s) of an SU/MU transmission. After the EHT preamble 2120, the EHT PPDU 2100 may comprise a data portion that includes service fields 2130 and PSDUs in one or more of the RUs 1-8.

The service fields 2130 may include a scrambler initialization bit sequence such as an 11 bit scrambler initialization bit sequence used for scrambling the data portion 2140. The source STA may use the scrambler initialization bit sequence to scramble the data portion of the RU of the EHT PPDU 2100 after the service field to inform the target STA how to descramble the data portion.

The data portion 2140 may include PSDUs addressed to the target STAs such as a PHY header with an RTS frame addressed to individual addresses or group addresses of the target STAs.

FIGS. 2E-F illustrate PPDU formats of EHT PPDU 2200. In FIGS. 2E-F, the EHT PPDU 2200 may be part of an MU PPDU such as the EHT PPDU 2100 shown in FIG. 2D. The EHT PPDU 2200 format is used for a DL transmission to one or more STAs if the PPDU is not a response to a triggering frame. In the EHT PPDU 2200, the EHT-SIG field is present.

As illustrated in FIG. 2F, the data field of the EHT PPDU 2200 may comprise a service field followed by a MAC frame 2210. The service field may include 2 octets (16 bits) and may comprise a scrambler initialization bit sequence used by the transmitting STA to scramble the remainder of the data field.

The remainder of the data field of the EHT PPDU 2200 may comprise an MPDU such as a MAC RTS frame. The MAC RTS frame may include a 2 octet frame control field, a 2 octet duration field, a 6 octet receiver address (RA) field, a 6 octet transmitter address (TA) field, and a 4 octet frame check sequence field comprising a value, such as a 32-bit cyclic redundancy code (CRC), to check the validity of and/or correct preceding frame.

The RA field of the RTS frame may comprise the address of the STA that is the intended immediate recipient of a pending individually addressed frame. The TA field may comprise the address of the STA transmitting the RTS frame or the bandwidth signaling TA of the STA transmitting the RTS frame. In other embodiments, the TA field may be a bandwidth signaling TA.

For all RTS frames sent by non-QoS STAs, the Duration field is the time, in microseconds, required to transmit the pending Data or Management frame, plus one CTS frame, plus one Ack frame, plus three SIFSs. If the calculated duration includes a fractional microsecond, that value is rounded up to the next higher integer.

For RTS frames sent by QoS STAs, in transmissions under EDCA by a STA that initiates a TXOP, there are two classes of duration settings: single protection and multiple protection. In single protection, the Duration field of the frame can set a network allocation vector (NAV) value at receiving STAs that protects up to the end of any following Data, Management, or response frame plus any additional overhead frames. In multiple protection, the Duration field of the frame can set a NAV that protects up to the estimated end of a sequence of multiple frames.

Figures 2G, 2H:
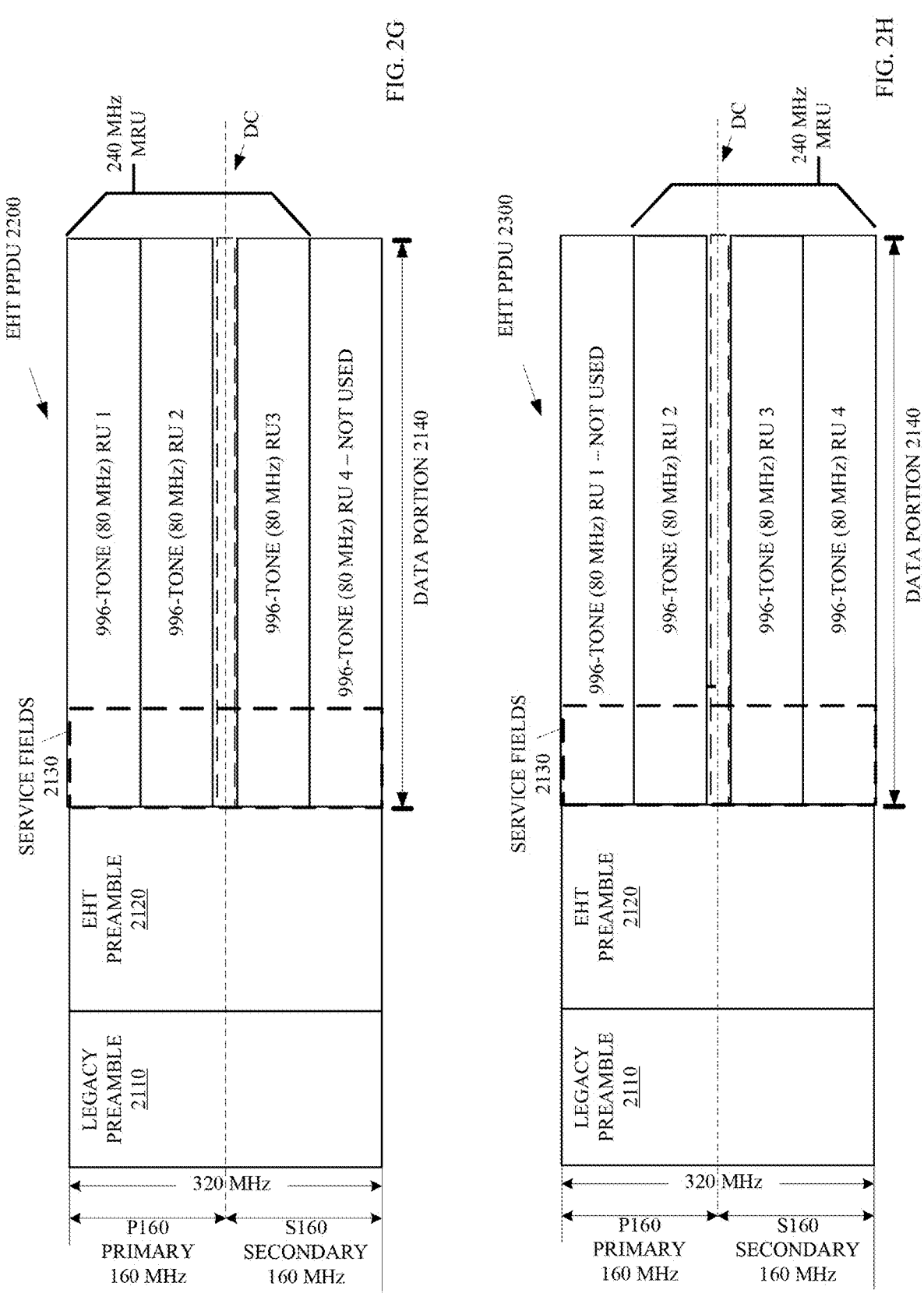
FIGS. 2G-H depict embodiments of an IEEE 802.11be non-OFDMA 320 MHz EHT PPDU.

In FIG. 2G illustrates an embodiment of a EHT PPDU 2200. EHT PPDU 2200 is similar to EHT PPDU 2100 in FIG. 2D except that EHT PPDU 2200 comprises four 996 tone RUs (80 MHz) and is in the form of an 802.11, non-OFDMA packet that is capable of a single transmission on the 240 MHz MRU of a 320 MHz PPDU. The MRU comprises a combination of 3 consecutive 996 tone RUs (3×80 MHz) for a total bandwidth of 240 MHz. RU 1 and RU2 include two contiguous 996 tone RUs residing on the primary 160 MHz P160 portion of the 320 MHz EHT PPDU 2400. Note that any puncturing pattern, including the 996×2 MRU and 996×2+484 MRU defined for 240 MHz transmission will be allowed within the RUs in this MRU.

The 996 tone RU 4 is not used. In some embodiments, the legacy preamble 2110, EHT preamble 2120, and/or service fields 2130 are not transmitted on the bandwidth of RU4 of the 320 MHz EHT PPDU 2200.

In FIG. 2H illustrates an embodiment of a EHT PPDU 2300. EHT PPDU 2300 is similar to EHT PPDU 2100 in FIG. 2D except that EHT PPDU 2300 comprises four 996 tone RUs (80 MHz each) and is in the form of an 802.11, non-OFDMA packet that is capable of a single transmission on the 240 MHz MRU of a 320 MHz PPDU. The MRU comprises a combination of 3 consecutive 996 tone RUs (3×80 MHz) for a total bandwidth of 240 MHz. RU 3 and RU 4 include two contiguous 996 tone RUs residing on the secondary 160 MHz S160 portion of the 320 MHz EHT PPDU 2400. Note that any puncturing pattern, including the 996×2 MRU and 996×2+484 MRU defined for 240 MHz transmission will be allowed within the RUs in this MRU.

The 996 tone RU 1 is not used. In some embodiments, the legacy preamble 2110, EHT preamble 2120, and/or service fields 2130 are not transmitted on the bandwidth of RU 1 of the 320 MHz EHT PPDU 2300.

In FIG. 2I illustrates an embodiment of a EHT PPDU 2300. EHT PPDU 2300 is similar to EHT PPDU 2100 in FIG. 2D except that EHT PPDU 2300 comprises three 996 tone RUs (80 MHz each) and two 484 tone RUs (40 MHz each) and is in the form of an 802.11, non-OFDMA packet and an OFDMA packet that is capable of a single transmission (non-OFDMA) or multiple transmissions (OFDMA) on the 200 MHz MRU of a 320 MHz PPDU. The MRU comprises a combination of 2 consecutive 996 tone RUs (2×80 MHz) residing in the P160 portion of the 320 MHz EHT PPDU 2400 and one 484 tone RU (40 MHz) residing in the 5160 portion of the 320 MHz EHT PPDU 2400 for a total bandwidth of 200 MHz. RU 4 comprises a 484 tone RU and RU 5 includes a 996 tone RU residing on the secondary 160 MHz 5160 portion of the 320 MHz EHT PPDU 2400.

For OFDMA transmissions, the 484 tone RU4 can be allocated to another user for a separate, simultaneous 40 MHz transmission. For non-OFDMA transmissions, the 484 tone RU4 cannot be allocated to another user for a separate, simultaneous 40 MHz transmission. The 996 tone RU 4 is not used. In some embodiments, the legacy preamble 2110, EHT preamble 2120, and/or service fields 2130 are not transmitted on the bandwidth of RU 4 of the 320 MHz EHT PPDU 2400.

In FIG. 2J illustrates an embodiment of a EHT PPDU 2500. EHT PPDU 2300 is similar to EHT PPDU 2100 in FIG. 2D except that EHT PPDU 2300 comprises three 996 tone RUs (80 MHz each) and two 484 tone RUs (40 MHz each) and is in the form of an 802.11, non-OFDMA packet and an OFDMA packet that is capable of a single transmission (non-OFDMA) or multiple transmissions (OFDMA) on the 200 MHz MRU of a 320 MHz PPDU. The MRU comprises a combination of 2 consecutive 996 tone RUs (2×80 MHz) residing in the S160 portion of the 320 MHz EHT PPDU 2500 and one 484 tone RU (40 MHz) residing in the P160 portion of the 320 MHz EHT PPDU 2500 for a total bandwidth of 200 MHz. RU 2 comprises a 484 tone RU and RU 1 includes a 996 tone RU residing on the primary 160 MHz P160 portion of the 320 MHz EHT PPDU 2500.

For OFDMA transmissions, the 484 tone RU 2 can be allocated to another user for a separate, simultaneous 40 MHz transmission. For non-OFDMA transmissions, the 484 tone RU 2 cannot be allocated to another user for a separate, simultaneous 40 MHz transmission. The 996 tone RU 1 is not used. In some embodiments, the legacy preamble 2110, EHT preamble 2120, and/or service fields 2130 are not transmitted on the bandwidth of RU 1 of the 320 MHz EHT PPDU 2400.

FIG. 3 depicts an embodiment of an apparatus to generate, transmit, receive, and interpret or decode PHY frames and MAC frames. In some embodiments, the apparatus may also include support for transmitting and/or receiving a wake-up radio packet (WUP) such as the wireless communications I/F of the wake-up radio (WUR) described in IEEE 802.11ba D8.0. The apparatus comprises a transceiver 3000 coupled with baseband processing circuitry 3001. The baseband processing circuitry 3001 may comprise a MAC logic circuitry 3091 and PHY logic circuitry 3092. In other embodiments, the baseband processing circuitry 3001 may be included on the transceiver 3000.

The MAC logic circuitry 3091 and PHY logic circuitry 3092 may comprise code executing on processing circuitry of a baseband processing circuitry 3001; circuitry to implement operations of functionality of the MAC or PHY; or a combination of both. The MAC logic circuitry 3091 may determine a frame such as a CTS frame and the PHY logic circuitry 3092 may determine the physical layer protocol data unit (PPDU) by prepending the frame, also called a MAC protocol data unit (MPDU), with a preamble to cause the antenna array 3018 to transmit.

The transceiver 3000 comprises a receiver 3004 and a transmitter 3006. Embodiments have many different combinations of modules to process data because the configurations are deployment specific. FIG. 3 illustrates some of the modules that are common to many embodiments. In some embodiments, one or more of the modules may be implemented in circuitry separate from the baseband processing circuitry 3001. In some embodiments, the baseband processing circuitry 3001 may execute code in processing circuitry of the baseband processing circuitry 3001 to implement one or more of the modules.

In the present embodiment, the transceiver 3000 also includes WUR circuitry 3110 and 3120. The WUR circuitry 3110 may comprise circuitry to use portions of the transmitter 3006 (a transmitter of the wireless communications I/F) to generate a WUR packet. For instance, the WUR circuitry 3110 may generate, e.g., an OOK signal with OFDM symbols to generate a WUR packet for transmission via the antenna array 3018. In other embodiments, the WUR may comprise an independent circuitry that does not use portions of the transmitter 3006.

Note that a station such as the STA 1210 in FIG. 1C may comprise multiple transmitters to facilitate concurrent transmissions on multiple contiguous and/or non-contiguous carrier frequencies.

The transmitter 3006 may comprise one or more of or all the modules including an encoder 3008, a stream deparser 3066, a frequency segment parser 3007, an interleaver 3009, a modulator 3010, a frequency segment deparser 3060, an OFDM 3012, an Inverse Fast Fourier Transform (IFFT) module 3015, a GI module 3045, and a transmitter front end 3040. The encoder 3008 of transmitter 3006 receives and encodes a data stream destined for transmission from the MAC logic circuitry 3091 with, e.g., a binary convolutional coding (BCC), a low-density parity check coding (LDPC), and/or the like. After coding, scrambling, puncturing and post-FEC (forward error correction) padding, a stream parser 3064 may optionally divide the data bit streams at the output of the FEC encoder into groups of bits. The frequency segment parser 3007 may receive data stream from encoder 3008 or streams from the stream parser 3064 and optionally parse each data stream into two or more frequency segments to build a contiguous or non-contiguous bandwidth based upon smaller bandwidth frequency segments. The interleaver 3009 may interleave rows and columns of bits to prevent long sequences of adjacent noisy bits from entering a BCC decoder of a receiver.

The modulator 3010 may receive the data stream from interleaver 3009 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 3010 may optionally be fed into the frequency segment deparser 3060 to combine frequency segments in a single, contiguous frequency bandwidth of, e.g., 320 MHz. Other embodiments may continue to process the frequency segments as separate data streams for, e.g. a non-contiguous 160+160 MHz bandwidth transmission.

After the modulator 3010, the data stream(s) are fed to an OFDM 3012. The OFDM 3012 may comprise a space-time block coding (STBC) module 3011, and a digital beamforming (DBF) module 3014. The STBC module 3011 may receive constellation points from the modulator 3010 corresponding to one or more spatial streams and may spread the spatial streams to a greater number of space-time streams. Further embodiments may omit the STBC.

The OFDM 3012 impresses or maps the modulated data formed as OFDM symbols onto a plurality of orthogonal subcarriers so the OFDM symbols are encoded with the subcarriers or tones. The OFDM symbols may be fed to the DBF module 3014. Generally, digital beam forming uses digital signal processing algorithms that operate on the signals received by, and transmitted from, an array of antenna elements. Transmit beamforming processes the channel state to compute a steering matrix that is applied to the transmitted signal to optimize reception at one or more receivers. This is achieved by combining elements in a phased antenna array in such a way that signals at particular angles experience constructive interference while others experience destructive interference.

The IFFT module 3015 may perform an inverse discrete Fourier transform (IDFT) on the OFDM symbols to map on the subcarriers. The guard interval (GI) module 3045 may insert guard intervals by prepending to the symbol a circular extension of itself. The GI module 3045 may also comprise windowing to optionally smooth the edges of each symbol to increase spectral decay.

The output of the GI module 3045 may enter the radio 3042 to convert the time domain signals into radio signals by combining the time domain signals with subcarrier frequencies to output into the transmitter front end module (TX FEM) 3040. The transmitter front end 3040 may comprise a with a power amplifier (PA) 3044 to amplify the signal and prepare the signal for transmission via the antenna array 3018. In many embodiments, entrance into a spatial reuse mode by a communications device such as a station or AP may reduce the amplification by the PA 3044 to reduce channel interference caused by transmissions.

The transceiver 3000 may also comprise duplexers 3016 connected to antenna array 3018. The antenna array 3018 radiates the information bearing signals into a time-varying, spatial distribution of electromagnetic energy that can be received by an antenna of a receiver. In several embodiments, the receiver 3004 and the transmitter 3006 may each comprise its own antenna(s) or antenna array(s).

The transceiver 3000 may comprise a receiver 3004 for receiving, demodulating, and decoding information bearing communication signals. The receiver 3004 may comprise a receiver front-end module (RX FEM) 3050 to detect the signal, detect the start of the packet, remove the carrier frequency, and amplify the subcarriers via a low noise amplifier (LNA) 3054 to output to the radio 3052. The radio 3052 may convert the radio signals into time domain signals to output to the GI module 3055 by removing the subcarrier frequencies from each tone of the radio signals.

The receiver 3004 may comprise a GI module 3055 and a fast Fourier transform (FFT) module 3019. The GI module 3055 may remove the guard intervals and the windowing and the FFT module 3019 may transform the communication signals from the time domain to the frequency domain.

The receiver 3004 may also comprise an OFDM 3022, a frequency segment parser 3062, a demodulator 3024, a deinterleaver 3025, a frequency segment deparser 3027, a stream deparser 3066, and a decoder 3026. An equalizer may output the weighted data signals for the OFDM packet to the OFDM 3022. The OFDM 3022 extracts signal information as OFDM symbols from the plurality of subcarriers onto which information-bearing communication signals are modulated.

The OFDM 3022 may comprise a DBF module 3020, and an STBC module 3021. The received signals are fed from the equalizer to the DBF module 3020. The DBF module 3020 may comprise algorithms to process the received signals as a directional transmission directed toward to the receiver 3004. And the STBC module 3021 may transform the data streams from the space-time streams to spatial streams.

The output of the STBC module 3021 may enter a frequency segment parser 3062 if the communication signal is received as a single, contiguous bandwidth signal to parse the signal into, e.g., two or more frequency segments for demodulation and deinterleaving.

The demodulator 3024 demodulates the spatial streams. Demodulation is the process of extracting data from the spatial streams to produce demodulated spatial streams. The deinterleaver 3025 may deinterleave the sequence of bits of information. The frequency segment deparser 3027 may optionally deparse frequency segments as received if received as separate frequency segment signals or may deparse the frequency segments determined by the optional frequency segment parser 3062. The decoder 3026 decodes the data from the demodulator 3024 and transmits the decoded information, the MPDU, to the MAC logic circuitry 3091.

The MAC logic circuitry 3091 may parse the MPDU based upon a format defined in the communications device for a frame to determine the particular type of frame by determining the type value and the subtype value. The MAC logic circuitry 3091 may then interpret the remainder of MPDU.

While the description of FIG. 3 focuses primarily on a single spatial stream system for simplicity, many embodiments are capable of multiple spatial stream transmissions and use parallel data processing paths for multiple spatial streams from the PHY logic circuitry 3092 through to transmission. Further embodiments may include the use of multiple encoders to afford implementation flexibility.

FIG. 4A illustrates an embodiment of a flowchart 4000 for generation and transmission of a non-OFDMA 320 MHz EHT PPDU. At element 4010, a STA (e.g., the user device(s) 1020 and/or the AP 1005 of FIG. 1A) may generate a non-OFDMA 320 MHz EHT PPDU may comprise a 240 MHz MRU, the 240 MHz MRU comprising at least two contiguous 996 tone resource units (RUs). In some embodiments, the 240 MHz MRU may comprise three contiguous 996 tone RUs. In some embodiments, the 240 MHz MRU may comprise the at least two contiguous 996 tone RUs in a primary 160 MHz of the non-OFDMA 320 MHz EHT PPDU. In some embodiments, the 240 MHz MRU may comprise the at least two contiguous 996 tone RUs in a secondary 160 MHz of the non-OFDMA 320 MHz EHT PPDU.

After generation of the non-OFDMA 320 MHz EHT PPDU, the PHY or baseband processing circuitry may cause the non-OFDMA 320 MHz EHT PPDU to be transmitted to another station (element 4020).

FIG. 4B illustrates an embodiment of a flowchart 4100 for generation and transmission of a non-OFDMA 320 MHz EHT PPDU. At element 4110, a STA (e.g., the user device(s)

1020 and/or the AP 1005 of FIG. 1A) may receive a non-OFDMA 320 MHz EHT PPDU may comprise a 240 MHz MRU, the 240 MHz MRU comprising at least two contiguous 996 tone resource units (RUs). In some embodiments, the MRU of the non-OFDMA 320 MHz EHT PPDU comprises two contiguous 996 tone RUs and the one 484 tone RU. In some embodiments, the 240 MHz MRU may comprise the non-OFDMA 320 MHz EHT PPDU comprises another 484 tone RU assignable to another user. In some embodiments, the MRU of the non-OFDMA 320 MHz EHT PPDU comprises the at least one 996 tone RU contiguous with the one 484 tone RU. In some embodiments, the non-OFDMA 320 MHz EHT PPDU comprises at least one other 484 tone RU assignable to another user.

After reception of the non-OFDMA 320 MHz EHT PPDU, the PHY, MAC layer, and/or baseband processing circuitry may decode the 320 MHz EHT PPDU (element 4120).

Figures 4C, 4D:
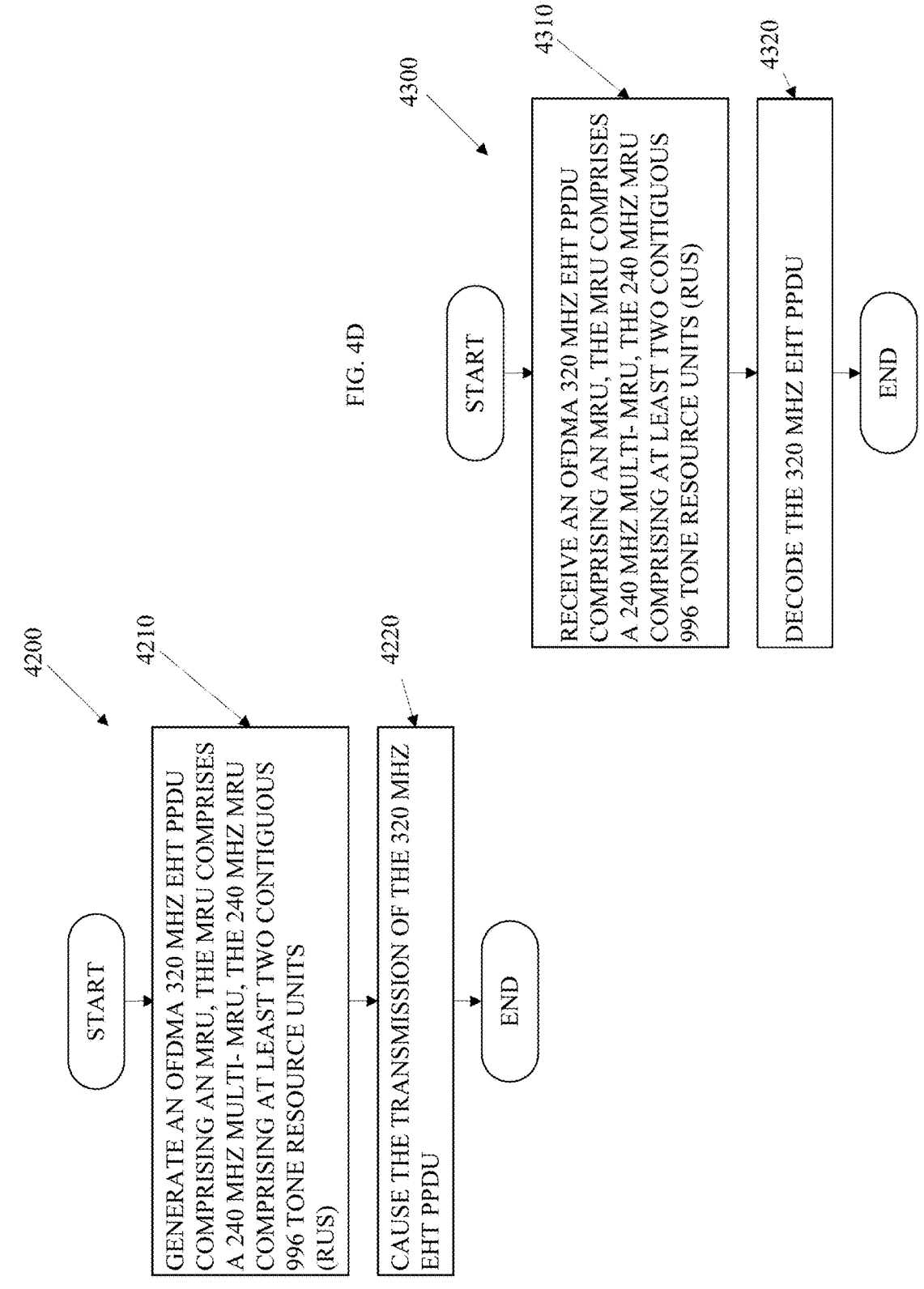
FIGS. 4C-D depict embodiments of flowcharts to generate, transmit, receive, and decode an OFDMA 320 MHz EHT PPDU.

Referring to FIG. 4C, illustrates an embodiment of a flowchart 4200 for generation and transmission of an OFDMA 320 MHz EHT PPDU. At element 4210, a STA (e.g., the user device(s) 1020 and/or the AP 1005 of FIG. 1A) may generate an OFDMA 320 MHz EHT PPDU, comprising an MRU, wherein the MRU comprises at least one 996 tone RU and one 484 tone RU. In some embodiments, the MRU of the OFDMA 320 MHz EHT PPDU comprises two contiguous 996 tone RUs and the one 484 tone RU. In some embodiments, the OFDMA 320 MHz EHT PPDU comprises another 484 tone RU assignable to another user. In some embodiments, MRU of the OFDMA 320 MHz EHT PPDU comprises the at least one 996 tone RU contiguous with the one 484 tone RU. In some embodiments, the OFDMA 320 MHz EHT PPDU comprises at least one other 484 tone RU assignable to another user.

After generation of the OFDMA 320 MHz EHT PPDU, the PHY or baseband processing circuitry may cause the OFDMA 320 MHz EHT PPDU to be transmitted to another station (element 4220).

Referring to FIG. 4D, illustrates an embodiment of a flowchart 4300 for generation and transmission of a OFDMA 320 MHz EHT PPDU. At element 4310, a STA (e.g., the user device(s) 1020 and/or the AP 1005 of FIG. 1A) may generate an OFDMA 320 MHz EHT PPDU comprising an MRU, wherein the MRU comprises at least one 996 tone RU and one 484 tone RU. In some embodiments, the MRU of the OFDMA 320 MHz EHT PPDU comprises two contiguous 996 tone RUs and the one 484 tone RU. In some embodiments, the OFDMA 320 MHz EHT PPDU comprises another 484 tone RU assignable to another user. In some embodiments, MRU of the OFDMA 320 MHz EHT PPDU comprises the at least one 996 tone RU contiguous with the one 484 tone RU. In some embodiments, the OFDMA 320 MHz EHT PPDU comprises at least one other 484 tone RU assignable to another user.

After reception of the OFDMA 320 MHz EHT PPDU, the PHY, MAC layer, and/or baseband processing circuitry may decode the 320 MHz EHT PPDU (element 4320).

Figure 4F:
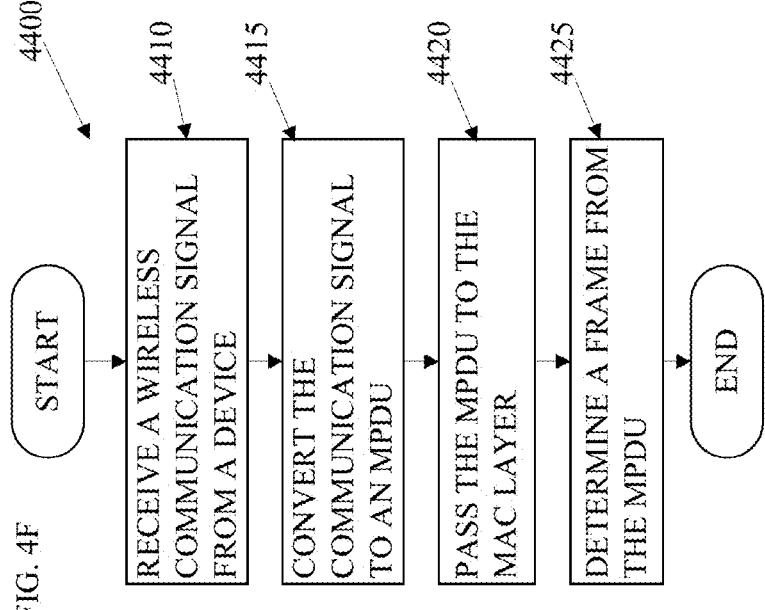
FIGS. 4E-F depict embodiments of flowcharts to generate and transmit frames and receive and interpret frames for communications between wireless communication devices.
Figure 4E:
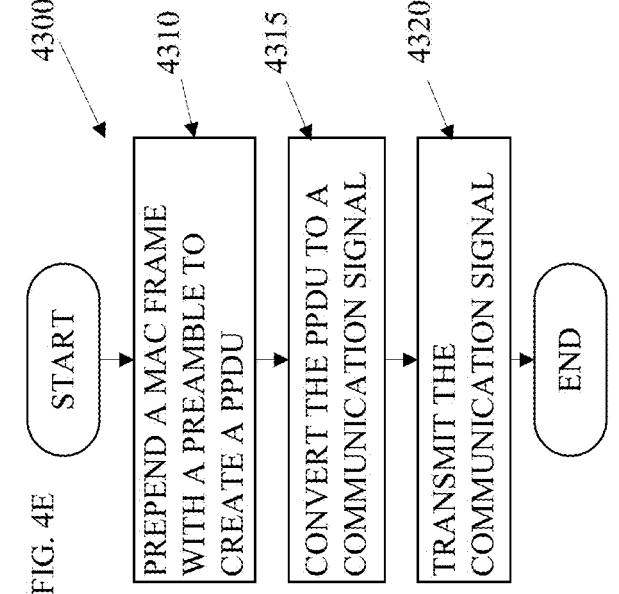

FIGS. 4E-F depict embodiments of flowcharts 4400 and 4500 to transmit, receive, and interpret communications with a frame. Referring to FIG. 4E, the flowchart 4300 may begin with the baseband processing circuitry or the PHY analog circuitry may encode and transform the PPDU into OFDM symbols for transmission to the STA 1210. The baseband processing circuitry or the PHY analog circuitry may generate a preamble to prepend the PHY service data unit (PSDU) (the MPDU) to form a PHY protocol data unit (PPDU) for transmission (element 4310).

In other embodiments, the baseband processing circuitry or the PHY analog circuitry may scramble the data field of the PPDU, excluding the service field, for transmission to the STA 1210.

The physical layer device such as the transmitter 3006 in FIG. 3 or the wireless network interfaces 1222 and 1252 in FIG. 1A may convert the PPDU to a communication signal via a radio (element 4315). The transmitter may then transmit the communication signal via the antenna coupled with the radio (element 4320).

Referring to FIG. 4F, the flowchart 4500 begins with a receiver of a device such as the receiver 3004 in FIG. 3 receiving a communication signal via one or more antenna (s) such as an antenna element of antenna array 3018 (element 4510). The receiver may convert the communication signal into an MPDU in accordance with the process described in the preamble (element 4515). More specifically, the received signal is fed from the one or more antennas to a DBF such as the DBF 220. The DBF transforms the antenna signals into information signals. The output of the DBF is fed to OFDM such as the OFDM 3022 in FIG. 3. The OFDM extracts signal information from the plurality of subcarriers onto which information-bearing signals are modulated. Then, the demodulator such as the demodulator 3024 demodulates the signal information via, e.g., BPSK, 16-QAM (quadrature amplitude modulation), 64-QAM, 256-QAM, 1024-QAM, or 4096-QAM with a forward error correction (FEC) coding rate (1/2, 2/3, 3/4, or 5/6). And the decoder such as the decoder 3026 decodes the signal information from the demodulator via, e.g., BCC or LDPC, to extract the MPDU and pass or communicate the MPDU to MAC layer such as MAC logic circuitry 3091 (element 4520).

The MAC layer may determine frame field values from the MPDU (element 4525) such as the control frame fields in the RTS frame shown in FIG. 2F. For instance, the MAC layer may determine frame field values such as the type and subtype field values of the RTS frame. The MAC layer may determine that the MPDU comprises a RTS frame so the MAC layer may generate a CTS frame in response if the sub-band of the channel is clear in accordance with the EDCA procedures.

Figure 5:
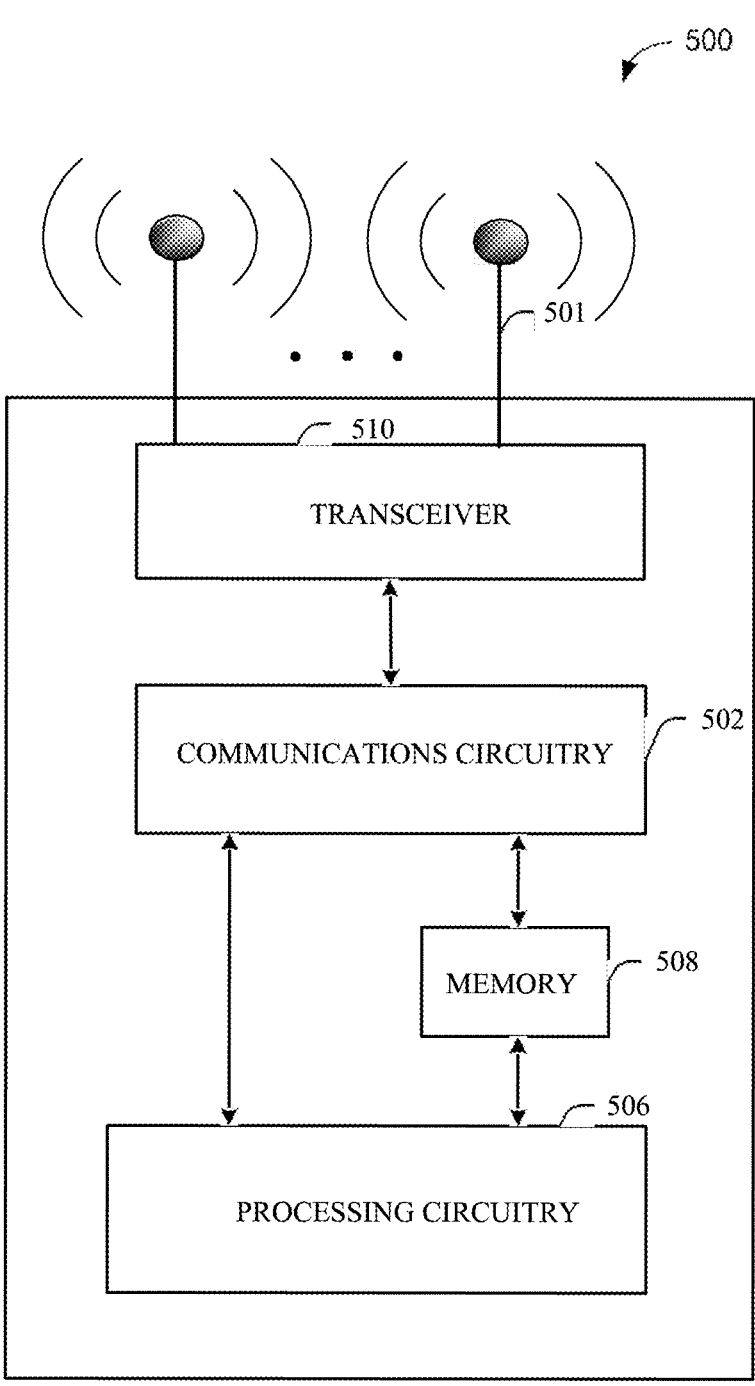
FIG. 5 depicts an embodiment of a functional diagram of a wireless communication device, in accordance with one or more example embodiments of the present disclosure.

FIG. 5 shows a functional diagram of an exemplary communication station 500, in accordance with one or more example embodiments of the present disclosure. In one embodiment, FIG. 5 illustrates a functional block diagram of a communication station that may be suitable for use as an AP 1005 (FIG. 1A) or a user device 1028 (FIG. 1A) in accordance with some embodiments. The communication station 500 may also be suitable for use as other user device(s) 1020 such as the user devices 1024 and/or 1026. The user devices 1024 and/or 1026 may include, e.g., a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

Figure 6:
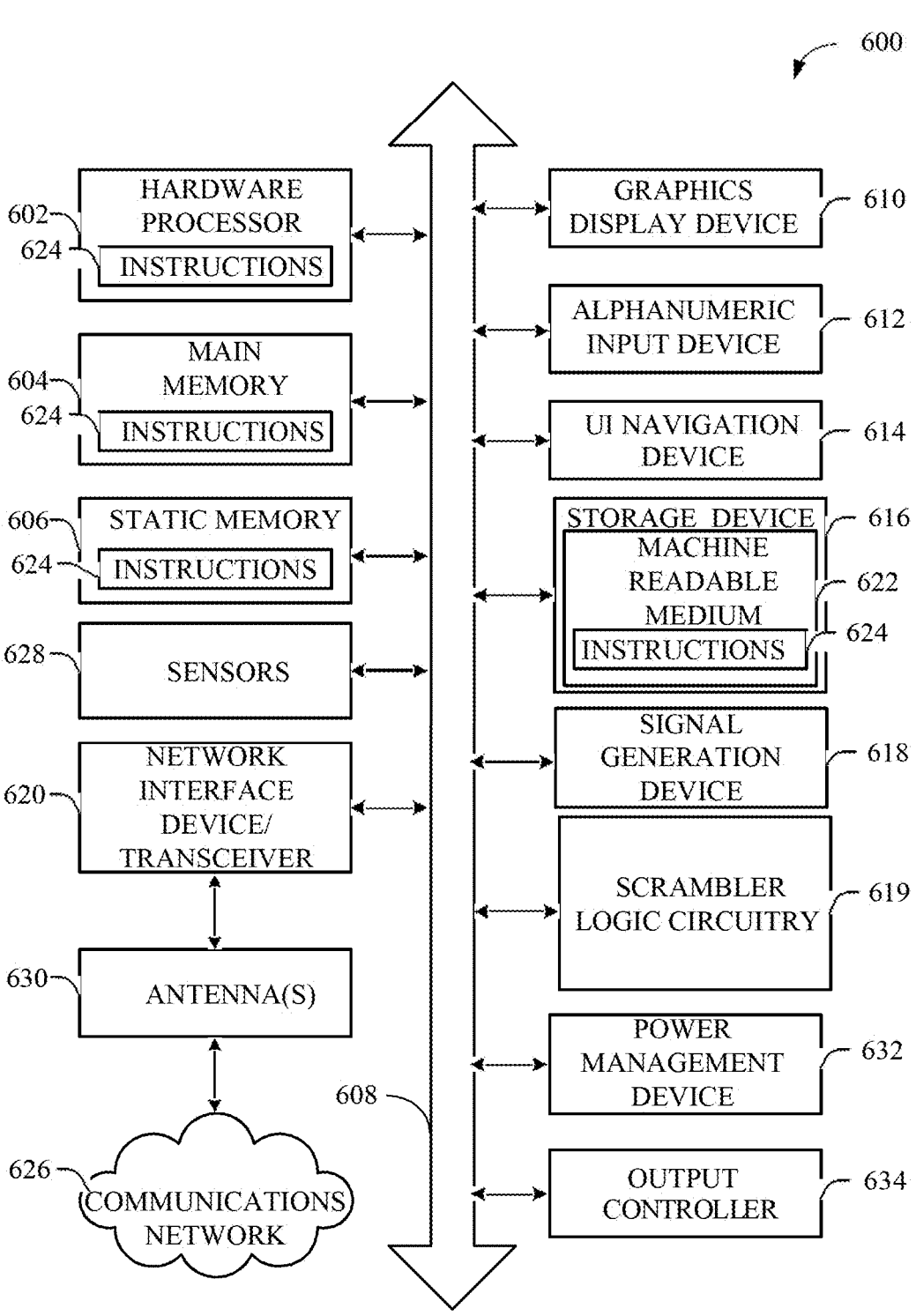
FIG. 6 depicts an embodiment of a block diagram of a machine upon which any of one or more techniques may be performed, in accordance with one or more embodiments.

FIG. 6 illustrates a block diagram of an example of a machine 600 or system upon which any one or more of the techniques (e.g., methodologies) discussed herein may be performed. For instance, the machine may comprise an AP such as the AP 1005 and/or one of the user devices 1020 shown in FIG. 1A. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via one or more interlinks (e.g., buses or high speed interconnects) 608. Note that the single set of interlinks 608 may be representative of the physical interlinks in some embodiments but is not representative of the physical interlinks 608 in other embodiments. For example, the main memory 604 may couple directly with the hardware processor 602 via high speed interconnects or a main memory bus. The high speed interconnects typically connect two devices and the bus is generally designed to interconnect two or more devices and include an arbitration scheme to provide fair access to the bus by the two or more devices.

The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a 320 MHz PPDU logic circuitry 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor such as the baseband processing circuitry 1218 and/or 1248 shown in FIG. 1C. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the 320 MHz PPDU logic circuitry 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The 320 MHz PPDU logic circuitry 619 may carry out or perform any of the operations and processes (e.g., flowcharts 4000, 4100, 4200, and 4300 shown in FIGS. 4A-D, respectively) described and shown above. For instance, the 320 MHz PPDU logic circuitry may generate a 240 MHz MRU for a non-orthogonal frequency division multiple access (non-OFDMA) 320 MHz EHT PPDU. In such embodiments, the 240 MHz MRU may comprise at least two contiguous 996 tone RUs. For instance, some embodiments may generate the 240 MHz MRU as three contiguous 996 tone RUs in a primary 160 MHz portion of a 320 MHz EHT PPDU. Further embodiments may generate the 240 MHz MRU as three contiguous 996 tone RUs with two of the 996 tone RUs residing in a primary 160 MHz portion of a 320 MHz EHT PPDU. Some embodiments may generate the 240 MHz MRU as three contiguous 996 tone RUs with two of the 996 tone RUs residing in a secondary 160 MHz portion of a 320 MHz EHT PPDU.

In other embodiments, the 320 MHz PPDU logic circuitry may generate an MRU for an orthogonal frequency division multiple access (OFDMA) 320 MHz EHT PPDU. In such embodiments, the MRU may comprise at least one 996 tone RU and one 484 tone RU. In some embodiments, the MRU for the OFDMA 320 MHz EHT PPDU may comprise two contiguous 996 tone RUs and the one 484 tone RU. In some embodiments, the MRU for the OFDMA 320 MHz EHT PPDU may comprise the at least one 996 tone RU contiguous with the one 484 tone RU. Note that the remainder of the 240 MHz transmission for the OFDMA 320 MHz EHT PPDU is advantageously assignable to one or more other users as allowable RUs.

It is understood that the above are only a subset of what the 320 MHz PPDU logic circuitry 619 may be configured to perform and that other functions included throughout this disclosure may also be performed by the 320 MHz PPDU logic circuitry 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
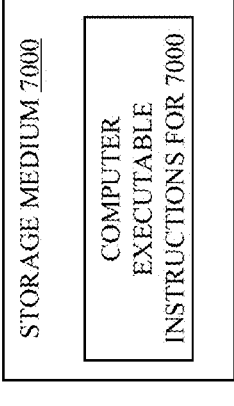
FIGS. 7-8 depict embodiments of a computer-readable storage medium and a computing platform to generate, transmit, receive, and decode a 320 MHz EHT PPDU.

FIG. 7 illustrates an example of a storage medium 7000 to store 320 MHz PPDU logic such as logic to implement the 320 MHz PPDU logic circuitry 619 shown in FIG. 6 and/or the other logic discussed herein to generate a non-OFDMA or OFDMA 320 MHz EHT PPDU comprising an MRU to merge 240 MHz transmission capabilities with the 320 MHz EHT PPDU. Storage medium 7000 may comprise an article of manufacture. In some examples, storage medium 7000 may include any non-transitory computer readable medium or machine-readable medium, such as an optical, magnetic or semiconductor storage. Storage medium 7000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 8:
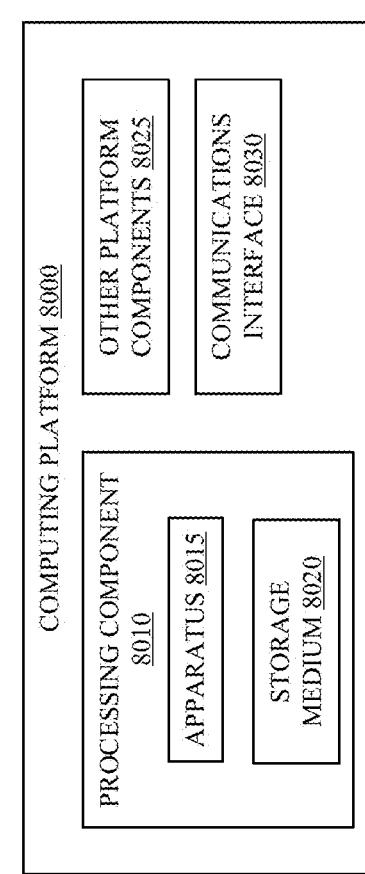

FIG. 8 illustrates an example computing platform 8000 such as the STAs 1210, 1230, 1290, 1292, 1294, 1296, and 1298 in FIG. 1A. In some examples, as shown in FIG. 8, computing platform 8000 may include a processing component 8010, other platform components or a communications interface 8030 such as the wireless network interfaces 1222 and 1252 shown in FIG. 1A. According to some examples, computing platform 8000 may be a computing device such as a server in a system such as a data center or server farm that supports a manager or controller for managing configurable computing resources as mentioned above.

According to some examples, processing component 8010 may execute processing operations or logic for apparatus 8015 described herein. Processing component 8010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 8020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 8025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 8030 may include logic and/or features to support a communication interface. For these examples, communications interface 8030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 8000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 8000 may include or exclude functions and/or specific configurations of the computing platform 8000 described herein.

The components and features of computing platform 8000 may comprise any combination of discrete circuitry, ASICs, logic gates and/or single chip architectures. Further, the features of computing platform 8000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

ADVANTAGES OF SOME EMBODIMENTS

Several embodiments have one or more potentially advantages effects. For instance, use of 320 MHz PPDU logic circuitry to facilitate 240 MHz transmissions in 320 MHz OFDMA and non-OFDMA PPDUs, advantageously conserves resources of the transmitting STA and/or the receiving STA. Facilitating 240 MHz transmissions in 320 MHz OFDMA and non-OFDMA PPDUs, advantageously increases flexibility in the production and design of STAs. Facilitating 240 MHz transmissions in 320 MHz OFDMA and non-OFDMA PPDUs, advantageously increases flexibility in the scheduling of transmissions to/from STAs. Facilitating 240 MHz transmissions in 320 MHz OFDMA and non-OFDMA PPDUs, advantageously reduces power consumption related to numbers of scheduled transmissions and for the scheduled transmissions to/from STAs.

EXAMPLES OF FURTHER EMBODIMENTS

The following examples pertain to further embodiments. Specifics in the examples may be used anywhere in one or more embodiments.

Example 1 is an apparatus comprising: a memory; and logic circuitry coupled with the memory to: generate a 320 megahertz (MHz) extremely high throughput (EHT) physical layer protocol data unit (PPDU) comprising a multi-resource unit (MRU), wherein generating the 320 MHz EHT PPDU comprises: generation of a non-orthogonal frequency division multiple access (non-OFDMA) 320 MHz EHT PPDU, wherein the MRU comprises a 240 MHz MRU, the 240 MHz MRU comprising at least two contiguous 996 tone resource units (RUs); or generation of an OFDMA 320 MHz EHT PPDU, wherein the MRU comprises at least one 996 tone RU and one 484 tone RU; and cause the transmission of the 320 MHz EHT PPDU. Example 2 is the apparatus of Example 1, wherein the logic circuitry comprises baseband processing circuitry and further comprising a radio coupled with the baseband processing circuitry, and one or more antennas coupled with the radio to transmit the second PPDU. Example 3 is the apparatus of Example 1, the 240 MHz MRU comprising the at least two contiguous 996 tone RUs and a third contiguous 996 tone RU. Example 4 is the apparatus of Example 1, wherein the 240 MHz MRU comprises the at least two contiguous 996 tone RUs in a primary 160 MHz of the non-OFDMA 320 MHz EHT PPDU. Example 5 is the apparatus of Example 1, wherein the 240 MHz MRU comprises the at least two contiguous 996 tone RUs in a secondary 160 MHz of the non-OFDMA 320 MHz EHT PPDU. Example 6 is the apparatus of Example 1, wherein the MRU of the OFDMA 320 MHz EHT PPDU comprises two contiguous 996 tone RUs and the one 484 tone RU. Example 7 is the apparatus of Example 6, wherein the two contiguous 996 tone RUs reside in the primary 160 MHz of the OFDMA 320 MHz EHT PPDU. Example 8 is the apparatus of Example 1, wherein the MRU of the OFDMA 320 MHz EHT PPDU comprises the at least one 996 tone RU contiguous with the one 484 tone RU. Example 9 is the apparatus of Example 8, wherein the at least one other 484 tone RU resides in the primary 160 MHz of the OFDMA 320 MHz EHT PPDU.

Example 10 is a non-transitory computer-readable medium, comprising instructions, which when executed by a processor, cause the processor to perform operations to: generate a 320 megahertz (MHz) extremely high throughput (EHT) physical layer protocol data unit (PPDU) comprising a multi-resource unit (MRU), wherein generating the 320 MHz EHT PPDU comprises: generation of a non-orthogonal frequency division multiple access (non-OFDMA) 320 MHz EHT PPDU, wherein the MRU comprises a 240 MHz MRU, the 240 MHz MRU comprising at least two contiguous 996 tone resource units (RUs); or generation of an OFDMA 320 MHz EHT PPDU, wherein the MRU comprises at least one 996 tone RU and one 484 tone RU; and cause the transmission of the 320 MHz EHT PPDU. Example 11 is the non-transitory computer-readable medium of Example 10, the 240 MHz MRU comprising the at least two contiguous 996 tone RUs and a third contiguous 996 tone RU. Example 12 is the non-transitory computer-readable medium of Example 10, wherein the 240 MHz MRU comprises the at least two contiguous 996 tone RUs in a primary 160 MHz of the non-OFDMA 320 MHz EHT PPDU. Example 13 is the non-transitory computer-readable medium of Example 10, wherein the 240 MHz MRU comprises the at least two contiguous 996 tone RUs in a secondary 160 MHz of the non-OFDMA 320 MHz EHT PPDU. Example 14 is the non-transitory computer-readable medium of Example 10, wherein the MRU of the OFDMA 320 MHz EHT PPDU comprises two contiguous 996 tone RUs and the one 484 tone RU. Example 15 is the non-transitory computer-readable medium of Example 14, wherein the two contiguous 996 tone RUs reside in the primary 160 MHz of the OFDMA 320 MHz EHT PPDU. Example 16 is the non-transitory computer-readable medium of Example 10, wherein the MRU of the OFDMA 320 MHz EHT PPDU comprises the at least one 996 tone RU contiguous with the one 484 tone RU. Example 17. The non-transitory computer-readable medium of Example 16, wherein the at least one other 484 tone RU resides in the primary 160 MHz of the OFDMA 320 MHz EHT PPDU.

Example 18 is a method comprising: generating a 320 megahertz (MHz) extremely high throughput (EHT) physical layer protocol data unit (PPDU) comprising a multi-resource unit (MRU), wherein generating the 320 MHz EHT PPDU comprises: generation of a non-orthogonal frequency division multiple access (non-OFDMA) 320 MHz EHT PPDU, wherein the MRU comprises a 240 MHz MRU, the 240 MHz MRU comprising at least two contiguous 996 tone resource units (RUs); or generation of an OFDMA 320 MHz EHT PPDU, wherein the MRU comprises at least one 996 tone RU and one 484 tone RU; and causing the transmission of the 320 MHz EHT PPDU. Example 19 is the method of Example 18, the 240 MHz MRU comprising the at least two contiguous 996 tone RUs and a third contiguous 996 tone RU. Example 20 is the method of Example 18, wherein the 240 MHz MRU comprises the at least two contiguous 996 tone RUs in a primary 160 MHz of the non-OFDMA 320 MHz EHT PPDU. Example 21 is the method of Example 18, wherein the 240 MHz MRU comprises the at least two contiguous 996 tone RUs in a secondary 160 MHz of the non-OFDMA 320 MHz EHT PPDU. Example 22 is the method of Example 18, wherein the MRU of the OFDMA 320 MHz EHT PPDU comprises two contiguous 996 tone RUs and the one 484 tone RU. Example 23 is the method of Example 22, wherein the two contiguous 996 tone RUs reside in the primary 160 MHz of the OFDMA 320 MHz EHT PPDU. Example 24 is the method of Example 18, wherein the MRU of the OFDMA 320 MHz EHT PPDU comprises the at least one 996 tone RU contiguous with the one 484 tone RU. Example 25. The method of Example 24, wherein the at least one other 484 tone RU resides in the primary 160 MHz of the OFDMA 320 MHz EHT PPDU.

Example 26 is a system comprising: one or more antennas; a radio coupled with the one or more antennas; a memory; baseband processing circuitry coupled with the radio and the memory to: generate a 320 megahertz (MHz) extremely high throughput (EHT) physical layer protocol data unit (PPDU) comprising a multi-resource unit (MRU), wherein generating the 320 MHz EHT PPDU comprises: generation of a non-orthogonal frequency division multiple access (non-OFDMA) 320 MHz EHT PPDU, wherein the MRU comprises a 240 MHz MRU, the 240 MHz MRU comprising at least two contiguous 996 tone resource units (RUs); or generation of an OFDMA 320 MHz EHT PPDU, wherein the MRU comprises at least one 996 tone RU and one 484 tone RU; and cause the transmission of the 320 MHz EHT PPDU via the one or more antennas. Example 27 is the system of Example 26, the 240 MHz MRU comprising the at least two contiguous 996 tone RUs and a third contiguous 996 tone RU. Example 28 is the system of Example 26, wherein the 240 MHz MRU comprises the at least two contiguous 996 tone RUs in a primary 160 MHz of the non-OFDMA 320 MHz EHT PPDU. Example 29 is the system of Example 26, wherein the 240 MHz MRU comprises the at least two contiguous 996 tone RUs in a secondary 160 MHz of the non-OFDMA 320 MHz EHT PPDU. Example 30 is the system of Example 26, wherein the MRU of the OFDMA 320 MHz EHT PPDU comprises two contiguous 996 tone RUs and the one 484 tone RU. Example 31 is the system of Example 30, wherein the two contiguous 996 tone RUs reside in the primary 160 MHz of the OFDMA 320 MHz EHT PPDU. Example 32 is the system of Example 26, wherein the MRU of the OFDMA 320 MHz EHT PPDU comprises the at least one 996 tone RU contiguous with the one 484 tone RU. Example 33 is the system of Example 26, wherein the at least one other 484 tone RU resides in the primary 160 MHz of the OFDMA 320 MHz EHT PPDU.

Example 34 is an apparatus comprising: a means for generating a 320 megahertz (MHz) extremely high throughput (EHT) physical layer protocol data unit (PPDU) comprising a multi-resource unit (MRU), wherein generating the 320 MHz EHT PPDU comprises: generation of a non-orthogonal frequency division multiple access (non-OFDMA) 320 MHz EHT PPDU, wherein the MRU comprises a 240 MHz MRU, the 240 MHz MRU comprising at least two contiguous 996 tone resource units (RUs); or generation of an OFDMA 320 MHz EHT PPDU, wherein the MRU comprises at least one 996 tone RU and one 484 tone RU; and a means for causing the transmission of the 320 MHz EHT PPDU. Example 35 is the apparatus of Example 34, wherein the means for generating a 320 MHZ EHT PPDU comprises baseband processing circuitry and further comprises a radio coupled with the baseband processing circuitry, and one or more antennas coupled with the radio to transmit the 320 MHz EHT PPDU. Example 36 is the apparatus of Example 34, the 240 MHz MRU comprising the at least two contiguous 996 tone RUs and a third contiguous 996 tone RU. Example 37 is the apparatus of Example 34, wherein the 240 MHz MRU comprises the at least two contiguous 996 tone RUs in a primary 160 MHz of the non-OFDMA 320 MHz EHT PPDU. Example 38 is the apparatus of Example 34, wherein the 240 MHz MRU comprises the at least two contiguous 996 tone RUs in a secondary 160 MHz of the non-OFDMA 320 MHz EHT PPDU. Example 39 is the apparatus of Example 34, wherein the MRU of the OFDMA 320 MHz EHT PPDU comprises two contiguous 996 tone RUs and the one 484 tone RU. Example 40 is the apparatus of Example 39, wherein the two contiguous 996 tone RUs reside in the primary 160 MHz of the OFDMA 320 MHz EHT PPDU. Example 41 is the apparatus of Example 34, wherein the MRU of the OFDMA 320 MHz EHT PPDU comprises the at least one 996 tone RU contiguous with the one 484 tone RU. Example 42 is the apparatus of Example 41, wherein the at least one other 484 tone RU resides in the primary 160 MHz of the OFDMA 320 MHz EHT PPDU.

Example 43 is an apparatus comprising: a memory; and logic circuitry coupled with the memory to: receive a 320 megahertz (MHz) extremely high throughput (EHT) physical layer protocol data unit (PPDU) comprising a multi-resource unit (MRU), wherein generating the 320 MHz EHT PPDU comprises: reception of a non-orthogonal frequency division multiple access (non-OFDMA) 320 MHz EHT PPDU, wherein the MRU comprises a 240 MHz MRU, the 240 MHz MRU comprising at least two contiguous 996 resource units (RUs); or reception of an OFDMA 320 MHz EHT PPDU, wherein the MRU comprises at least one 996 tone RU and one 484 tone RU; and decode the 320 MHz EHT PPDU. Example 44 is the apparatus of Example 43, wherein the logic circuitry comprises baseband processing circuitry and further comprising a radio coupled with the baseband processing circuitry, and one or more antennas coupled with the radio to receive the 320 MHz EHT PPDU. Example 45 is the apparatus of Example 43, the 240 MHz MRU comprising the at least two contiguous 996 tone RUs and a third contiguous 996 tone RU. Example 46 is the apparatus of Example 43, wherein the 240 MHz MRU comprises the at least two contiguous 996 tone RUs in a primary 160 MHz of the non-OFDMA 320 MHz EHT PPDU. Example 47 is the apparatus of Example 43, wherein the 240 MHz MRU comprises the at least two contiguous 996 tone RUs in a secondary 160 MHz of the non-OFDMA 320 MHz EHT PPDU. Example 48 is the apparatus of Example 43, wherein the MRU of the OFDMA 320 MHz EHT PPDU comprises two contiguous 996 tone RUs and the one 484 tone RU. Example 49 is the apparatus of Example 48, wherein the two contiguous 996 tone RUs reside in the primary 160 MHz of the OFDMA 320 MHz EHT PPDU. Example 50 is the apparatus of Example 43, wherein the MRU of the OFDMA 320 MHz EHT PPDU comprises the at least one 996 tone RU contiguous with the one 484 tone RU.

Example 51 is a non-transitory computer-readable medium, comprising instructions, which when executed by a processor, cause the processor to perform operations to: receive a 320 megahertz (MHz) extremely high throughput (EHT) physical layer protocol data unit (PPDU) comprising a multi-resource unit (MRU), wherein generating the 320 MHz EHT PPDU comprises: reception of a non-orthogonal frequency division multiple access (non-OFDMA) 320 MHz EHT PPDU, wherein the MRU comprises a 240 MHz MRU, the 240 MHz MRU comprising at least two contiguous 996 tone resource units (RUs); or reception of an OFDMA 320 MHz EHT PPDU, wherein the MRU comprises at least one 996 tone RU and one 484 tone RU; and decode the 320 MHz EHT PPDU. Example 52 is the non-transitory computer-readable medium of Example 51, wherein the logic circuitry comprises baseband processing circuitry and further comprising a radio coupled with the baseband processing circuitry, and one or more antennas coupled with the radio to receive the 320 MHz EHT PPDU. Example 53 is the non-transitory computer-readable medium of Example 52, the 240 MHz MRU comprising the at least two contiguous 996 tone RUs and a third contiguous 996 tone RU. Example 54 is the non-transitory computer-readable medium of Example 53, wherein the 240 MHz MRU comprises the at least two contiguous 996 tone RUs in a primary 160 MHz of the non-OFDMA 320 MHz EHT PPDU. Example 55 is the non-transitory computer-readable medium of Example 51, wherein the 240 MHz MRU comprises the at least two contiguous 996 tone RUs in a secondary 160 MHz of the non-OFDMA 320 MHz EHT PPDU. Example 56 is the non-transitory computer-readable medium of Example 51, wherein the MRU of the OFDMA 320 MHz EHT PPDU comprises two contiguous 996 tone RUs and the one 484 tone RU and wherein the two contiguous 996 tone RUs reside in the primary 160 MHz of the OFDMA 320 MHz EHT PPDU. Example 57 is the non-transitory computer-readable medium of Example 51, wherein the MRU of the OFDMA 320 MHz EHT PPDU comprises the at least one 996 tone RU contiguous with the one 484 tone RU.

Example 58 is a method comprising: receiving a 320 megahertz (MHz) extremely high throughput (EHT) physical layer protocol data unit (PPDU) comprising a multi-resource unit (MRU), wherein generating the 320 MHz EHT PPDU comprises: reception of a non-orthogonal frequency division multiple access (non-OFDMA) 320 MHz EHT PPDU, wherein the MRU comprises a 240 MHz MRU, the 240 MHz MRU comprising at least two contiguous 996 tone resource units (RUs); or reception of an OFDMA 320 MHz EHT PPDU, wherein the MRU comprises at least one 996 tone RU and one 484 tone RU; and decoding the 320 MHz EHT PPDU. Example 59 is the method of Example 58, the 240 MHz MRU comprising the at least two contiguous 996 tone RUs and a third contiguous 996 tone RU. Example 60 is the method of Example 58, wherein the 240 MHz MRU comprises the at least two contiguous 996 tone RUs in a primary 160 MHz of the non-OFDMA 320 MHz EHT PPDU. Example 61 is the method of Example 58, wherein the 240 MHz MRU comprises the at least two contiguous 996 tone RUs in a secondary 160 MHz of the non-OFDMA 320 MHz EHT PPDU. Example 62 is the method of Example 58, wherein the MRU of the OFDMA 320 MHz EHT PPDU comprises two contiguous 996 tone RUs and the one 484 tone RU and wherein the two contiguous 996 tone RUs reside in the primary 160 MHz of the OFDMA 320 MHz EHT PPDU. Example 63 is the method of Example 63, wherein the two contiguous 996 tone RUs reside in the primary 160 MHz of the OFDMA 320 MHz EHT PPDU. Example 64 is the method of Example 58, wherein the MRU of the OFDMA 320 MHz EHT PPDU comprises the at least one 996 tone RU contiguous with the one 484 tone RU.

Example 65 is a system comprising: one or more antennas; a radio coupled with the one or more antennas; a memory; baseband processing circuitry coupled with the radio and the memory to: receive a 320 megahertz (MHz) extremely high throughput (EHT) physical layer protocol data unit (PPDU) comprising a multi-resource unit (MRU), wherein generating the 320 MHz EHT PPDU comprises: reception of a non-orthogonal frequency division multiple access (non-OFDMA) 320 MHz EHT PPDU, wherein the MRU comprises a 240 MHz MRU, the 240 MHz MRU comprising at least two contiguous 996 tone resource units (RUs); or reception of an OFDMA 320 MHz EHT PPDU, wherein the MRU comprises at least one 996 tone RU and one 484 tone RU; and decode the 320 MHz EHT PPDU. Example 66 is the system of Example 65, the 240 MHz MRU comprising the at least two contiguous 996 tone RUs and a third contiguous 996 tone RU. Example 67 is the system of Example 65, wherein the 240 MHz MRU comprises the at least two contiguous 996 tone RUs in a primary 160 MHz of the non-OFDMA 320 MHz EHT PPDU. Example 68 is the system of Example 65, wherein the 240 MHz MRU comprises the at least two contiguous 996 tone RUs in a secondary 160 MHz of the non-OFDMA 320 MHz EHT PPDU. Example 69 is the system of Example 65, wherein the MRU of the OFDMA 320 MHz EHT PPDU comprises two contiguous 996 tone RUs and the one 484 tone RU. Example 70 is the system of Example 69, wherein the two contiguous 996 tone RUs reside in the primary 160 MHz of the OFDMA 320 MHz EHT PPDU. Example 71 is the system of Example 65, wherein the MRU of the OFDMA 320 MHz EHT PPDU comprises the at least one 996 tone RU contiguous with the one 484 tone RU.

Example 72 is an apparatus comprising: a means for receiving a 320 megahertz (MHz) extremely high throughput (EHT) physical layer protocol data unit (PPDU) comprising a multi-resource unit (MRU), wherein generating the 320 MHz EHT PPDU comprises: reception of a non-orthogonal frequency division multiple access (non-OFDMA) 320 MHz EHT PPDU, wherein the MRU comprises a 240 MHz MRU, the 240 MHz MRU comprising at least two contiguous 996 tone resource units (RUs); or reception of an OFDMA 320 MHz EHT PPDU, wherein the MRU comprises at least one 996 tone RU and one 484 tone RU; and a means for decoding the 320 MHz EHT PPDU. Example 73 is the apparatus of Example 72, the 240 MHz MRU comprising the at least two contiguous 996 tone RUs and a third contiguous 996 tone RU. Example 74 is the apparatus of Example 72, wherein the 240 MHz MRU comprises the at least two contiguous 996 tone RUs in a primary 160 MHz of the non-OFDMA 320 MHz EHT PPDU. Example 75 is the apparatus of Example 72, wherein the 240 MHz MRU comprises the at least two contiguous 996 tone RUs in a secondary 160 MHz of the non-OFDMA 320 MHz EHT PPDU. Example 76 is the apparatus of Example 72, wherein the MRU of the OFDMA 320 MHz EHT PPDU comprises two contiguous 996 tone RUs and the one 484 tone RU. Example 77 is the apparatus of Example 72, wherein the two contiguous 996 tone RUs reside in the primary 160 MHz of the OFDMA 320 MHz EHT PPDU. Example 78 is the apparatus of Example 72, wherein the MRU of the OFDMA 320 MHz EHT PPDU comprises the at least one 996 tone RU contiguous with the one 484 tone RU.

What is claimed is:

1. An apparatus comprising:
a memory; and
circuitry coupled with the memory to:
generate a 320 megahertz (MHz) extremely high throughput (EHT) physical layer protocol data unit (PPDU) comprising a multi-resource unit (MRU), wherein generating the 320 MHz EHT PPDU comprises:
    generation of the 320 MHz EHT PPDU as an orthogonal frequency division multiple access (OFDMA) 320 MHz EHT PPDU, wherein the MRU is within a 240 MHz bandwidth and includes:
      two contiguous 996 tone resource units (RUs) and one non-contiguous 484 tone RU; or
      one 996 tone RU contiguous with one 484 tone RU and one non-contiguous 996 tone RU; and
cause transmission of the 320 MHz EHT PPDU.

2. The apparatus of claim 1, wherein the circuitry comprises baseband processing circuitry and further comprising a radio coupled with the baseband processing circuitry, and one or more antennas coupled with the radio to transmit the 320 MHz EHT PPDU with a 240 MHz transmission.

3. The apparatus of claim 1, further comprising generation of a subsequent 320 MHz EHT PPDU as a non-orthogonal frequency division multiple access (non-OFDMA) 320 MHZ EHT PPDU comprising a second MRU, wherein the second MRU comprises a puncturing pattern with at least two 996 tone RUs.

4. The apparatus of claim 3, wherein the second MRU comprises the at least two 996 tone RUs in a primary 160 MHz of the non-OFDMA 320 MHz EHT PPDU.

5. The apparatus of claim 3, wherein the second MRU comprises the at least two 996 tone RUs in a secondary 160 MHz of the non-OFDMA 320 MHz EHT PPDU.

6. The apparatus of claim 1, wherein the MRU of the OFDMA 320 MHz EHT PPDU comprises two 996 tone RUs in a primary 160 MHz and the one 484 tone RU in a secondary 160 MHz.

7. The apparatus of claim 1, wherein the two 996 tone RUs reside in a secondary 160 MHz of the OFDMA 320 MHz EHT PPDU.

8. The apparatus of claim 1, wherein the one 484 tone RU resides in a primary 160 GHz.

9. The apparatus of claim 8, wherein the OFDMA 320 MHz EHT PPDU comprises another 484 tone assignable to another user.

10. A non-transitory computer-readable medium, comprising instructions, which when executed by a processor, cause the processor to perform operations to:
generate a 320 megahertz (MHz) extremely high throughput (EHT) physical layer protocol data unit (PPDU) comprising a multi-resource unit (MRU), wherein generating the 320 MHz EHT PPDU comprises:
    generation of the 320 MHz EHT PPDU as an orthogonal frequency division multiple access (OFDMA) 320 MHZ EHT PPDU, wherein the MRU is within a 240 MHz bandwidth and includes:
      two contiguous 996 tone resource units (RUs) and one non-contiguous 484 tone RU; or
      one 996 tone RU contiguous with one 484 tone RU and one non-contiguous 996 tone RU; and
cause transmission of the 320 MHz EHT PPDU.

11. The non-transitory computer-readable medium of claim 10, further comprising generation of a subsequent 320

MHz EHT PPDU as a non-orthogonal frequency division multiple access (non-OFDMA) 320 MHz EHT PPDU comprising a second MRU, wherein the second MRU comprises a puncturing pattern with at least two 996 tone RUs.

12. The non-transitory computer-readable medium of claim 11, wherein the second MRU comprises the at least two 996 tone RUs in a primary 160 MHz of the non-OFDMA 320 MHz EHT PPDU.

13. The non-transitory computer-readable medium of claim 11, wherein the second MRU comprises the at least two 996 tone RUs in a secondary 160 MHz of the non-OFDMA 320 MHz EHT PPDU.

14. The non-transitory computer-readable medium of claim 10, wherein the MRU of the OFDMA 320 MHz EHT PPDU comprises two 996 tone RUs in a primary 160 MHz and the one 484 tone RU in a secondary 160 MHz.

15. An apparatus comprising:
a memory; and
circuitry coupled with the memory to:
receive a 320 megahertz (MHz) extremely high throughput (EHT) physical layer protocol data unit (PPDU) comprising a multi-resource unit (MRU), wherein reception of the 320 MHz EHT PPDU comprises:
    reception of the 320 MHz EHT PPDU as an orthogonal frequency division multiple access (OFDMA) 320 MHZ EHT PPDU, wherein the MRU is within a 240 MHz bandwidth and includes:
      two contiguous 996 tone resource units (RUs) and one non-contiguous 484 tone RU; or
      one 996 tone RU contiguous with one 484 tone RU and one non-contiguous 996 tone RU; and
decode the 320 MHz EHT PPDU.

16. The apparatus of claim 15, wherein the circuitry comprises baseband processing circuitry and further comprising a radio coupled with the baseband processing circuitry, and one or more antennas coupled with the radio to receive the 320 MHz EHT PPDU.

17. The apparatus of claim 15, further comprising reception of a subsequent 320 MHz EHT PPDU as a non-orthogonal frequency division multiple access (non-OFDMA) 320 MHz EHT PPDU comprising a second MRU, wherein the second MRU comprises a puncturing pattern with at least two 996 tone RUs.

18. The apparatus of claim 17, wherein the second MRU comprises the at least two 996 tone RUs in a primary 160 MHz of the non-OFDMA 320 MHz EHT PPDU.

19. The apparatus of claim 17, wherein the MRU comprises the at least two 996 tone RUs in a secondary 160 MHz of the non-OFDMA 320 MHz EHT PPDU.

20. The apparatus of claim 15, wherein the MRU of the OFDMA 320 MHz EHT PPDU comprises two 996 tone RUs in a primary 160 MHz and the one 484 tone RU in a secondary 160 MHz.

21. A non-transitory computer-readable medium, comprising instructions, which when executed by a processor, cause the processor to perform operations to:
receive a 320 megahertz (MHz) extremely high throughput (EHT) physical layer protocol data unit (PPDU) comprising a multi-resource unit (MRU), wherein reception of the 320 MHz EHT PPDU comprises:
    reception of the 320 MHz EHT PPDU as an orthogonal frequency division multiple access (OFDMA) 320 MHZ EHT PPDU, wherein the MRU is within a 240 MHz bandwidth and includes:
      two contiguous 996 tone resource units (RUs) and one non-contiguous 484 tone RU; or one 996 tone RU contiguous with one 484 tone RU and
one non-contiguous 996 tone RU; and
decode the 320 MHz EHT PPDU.

22. The non-transitory computer-readable medium of claim 21, the operations to further comprise reception of a subsequent 320 MHz EHT PPDU as a non-orthogonal frequency division multiple access (non-OFDMA) 320 MHz EHT PPDU comprising a second MRU, wherein the second MRU comprises a puncturing pattern with at least two 996 tone RUs.

23. The non-transitory computer-readable medium of claim 22, the second MRU comprising the at least two 996 tone RUs as contiguous 996 tone RUs and a third 996 tone RU of the non-OFDMA 320 MHz EHT PPDU.

24. The non-transitory computer-readable medium of claim 22, wherein the second MRU comprises the at least two 996 tone RUs in a primary 160 MHz of the non-OFDMA 320 MHz EHT PPDU.

25. The non-transitory computer-readable medium of claim 21, wherein the MRU of the OFDMA 320 MHz EHT PPDU comprises two 996 tone RUs in a secondary 160 MHz and the one 484 tone RU in a primary 160 MHz.

* * * * *